(12) United States Patent
Pratt et al.

(10) Patent No.: US 12,196,873 B1
(45) Date of Patent: Jan. 14, 2025

(54) DIFFERENTIATED MULTI-AGENT NAVIGATION

(71) Applicant: SB Technology, Inc., Tarrytown, NY (US)

(72) Inventors: Ethan Jesse Pratt, Santa Clara, CA (US); Luca Ferrara, Redwood City, CA (US)

(73) Assignee: SB Technology, Inc., Tarrytown, NY (US)

( * ) Notice: Subject to any disclaimer, the term of this patent is extended or adjusted under 35 U.S.C. 154(b) by 0 days.

(21) Appl. No.: 18/204,321

(22) Filed: May 31, 2023

(51) Int. Cl.
*G01S 5/02* (2010.01)
*G01C 21/00* (2006.01)
*G01C 21/20* (2006.01)
*G01S 5/00* (2006.01)
*G01S 19/48* (2010.01)

(52) U.S. Cl.
CPC .......... *G01S 5/0289* (2013.01); *G01C 21/005* (2013.01); *G01C 21/20* (2013.01); *G01C 21/38* (2020.08); *G01S 5/009* (2013.01); *G01S 5/01* (2020.05); *G01S 19/485* (2020.05)

(58) Field of Classification Search
CPC .......... G01S 5/0289; G01S 5/009; G01S 5/01; G01S 19/485; G01C 21/005; G01C 21/20; G01C 21/38
See application file for complete search history.

(56) References Cited

U.S. PATENT DOCUMENTS

| | | | |
|---|---|---|---|
| 8,930,049 B2 * | 1/2015 | Mamidipudi | G01S 17/95 356/336 |
| 10,620,296 B1 | 4/2020 | Ezal et al. | |
| 2013/0238168 A1 * | 9/2013 | Reyes | B64C 39/024 701/2 |
| 2014/0163775 A1 * | 6/2014 | Metzler | B64C 19/00 701/2 |
| 2020/0088521 A1 * | 3/2020 | Glevarec | G01C 21/188 |
| 2021/0396542 A1 * | 12/2021 | Toutov | G01C 21/1654 |

OTHER PUBLICATIONS

U.S. Appl. No. 17/964,841, filed Oct. 12, 2022, Chernyy et al.
(Continued)

*Primary Examiner* — Alan D Hutchinson
(74) *Attorney, Agent, or Firm* — Fish & Richardson P.C.

(57) ABSTRACT

Example computer-implemented methods and systems for anomaly-sensing based multi-agent navigation are disclosed. One example computer-implemented method includes: receiving relative distance data specifying distance between at least one pair of agents of a plurality of agents, each of a first subset of the plurality of agents having an anomaly sensor subsystem; determining a set of relative pose vectors based at least in part on the relative distance data; receiving anomaly data from at least one anomaly sensor subsystem of one of the plurality of agents, obtaining pre-surveyed map data; determining global pose data of the plurality of agents based on the relative distance data and based on comparing the anomaly data to the pre-surveyed map data; and assigning a task to at least one of the plurality of agents based at least in part on a specialized operational capability of the at least one of the plurality of agents.

19 Claims, 14 Drawing Sheets

(56) References Cited

OTHER PUBLICATIONS

Badea et al., "Indoor navigation with pseudolites (fake GPS sat.)," Linkoping University Thesis, Jan. 27, 2005, ISRN LITH-ITN-ED-EX-05/001-SE, 120 pages.

Canciani, "Absolute Positioning Using the Earth's Magnetic Anomaly Field," Theses and Dissertations, Sep. 15, 2016, retrieved from URL<https://scholar.afit.edu/etd/251>, 265 pages.

Gade, "The Seven Ways to Find Heading," The Journal of Navigation, Sep. 2016, 69(5): 955-970, 17 pages.

Grasso et al., "Distributed underwater glider network with consensus Kalman filter for environmental field estimation," Oceans 2015, May 2015, 10 pages.

La et al., "Cooperative and Active Sensing in Mobile Sensor Networks for Scalar Field Mapping, " IEEE Transactions On Systems, Man, and Cybernetics: Systems, Jan. 2015, 45(1): 1-12.

La et al., "Distributed Sensor Fusion for Scalar Field Mapping Using Mobile Sensor Networks," IEEE Transactions On Cybernetics, Apr. 2013, 43(2): 766-778, 13 pages.

Lee et al., "MagSLAM: Aerial Simultaneous Localization and Mapping using Earth's Magnetic Anomaly Field," Navigation, 2020, 67: 95-107, 14 pages.

Leliak, "Identification and Evaluation of Magnetic-Field Sources of Magnetic Airborne Detector Equipped Aircraft," IRE Transactions on Aerospace and Navigational Electronics, 1961, ANE-8(3), 95-105.

LeMaster, "Self-calibrating pseudolite arrays: Theory and experiment," ProQuest Dissertations And Theses, Stanford University PhD theses (63-04), Publication No. AAI3048566, May 2002, 188 pages.

Meyer et al., "EMAG2: Earth Magnetic Anomaly Grid (2-arc-minute resolution), " Poster, Version 3 NOAA National Centers for Environmental Information, 2017, retrieved Mar. 7, 2023, retrieved from URL<https://doi.org/10.7289/V5H70CVX>, 1 page.

Rahmani et al., "Space vehicle swarm exploration missions: a study of key enabling technologies and gaps," 70th International Astronautical Congress, Oct. 2019, IAC-19-D1.2, 26 pages.

Vetrella et al., "Satellite and Vision-Aided Sensor Fusion for Cooperative Navigation of Unmanned Aircraft Swarms," Aerospace Research Central, Apr. 17, 2017, 14(6) (abstract only).

Yang et al., "Cooperative Navigation Using Pairwise Communication with Ranging and Magnetic Anomaly Measurements," Journal of Aerospace Information Systems, Nov. 2020, 17(11), 10 pages.

Yang et al., "Cooperative UAV Navigation using Inter-Vehicle Ranging and Magnetic Anomaly Measurements," AIAA SciTech Forum, Jan. 2018, 16 pages.

* cited by examiner

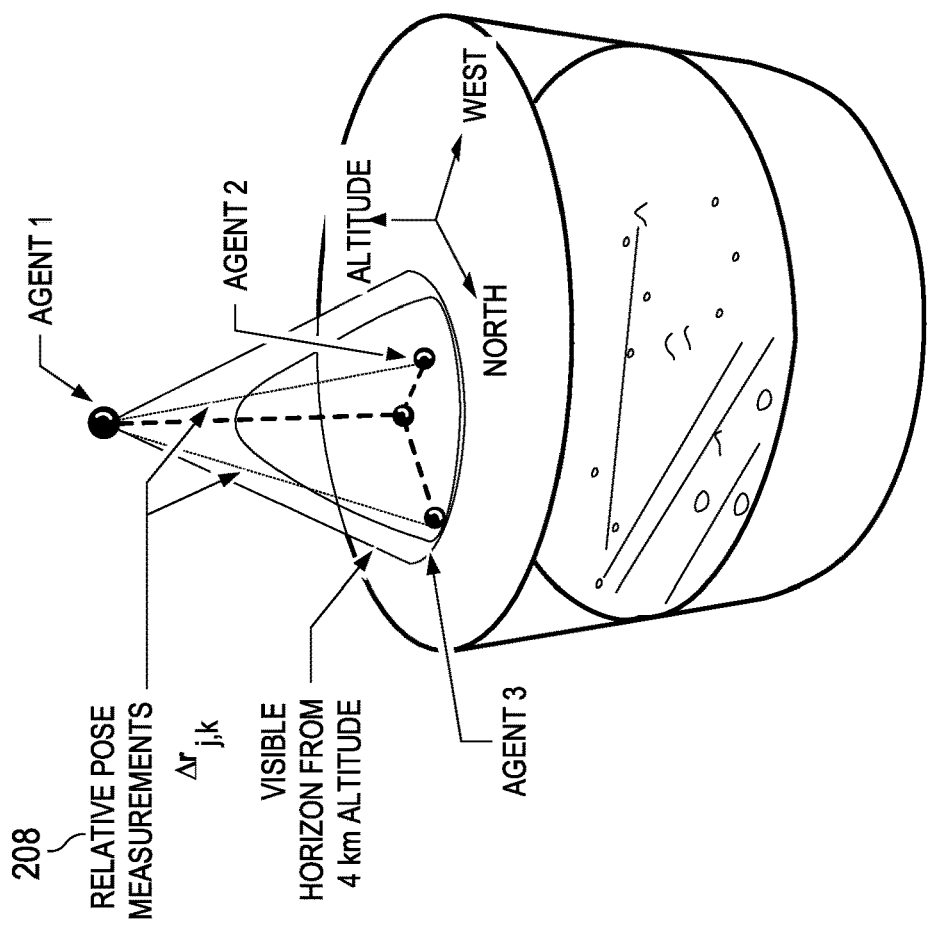
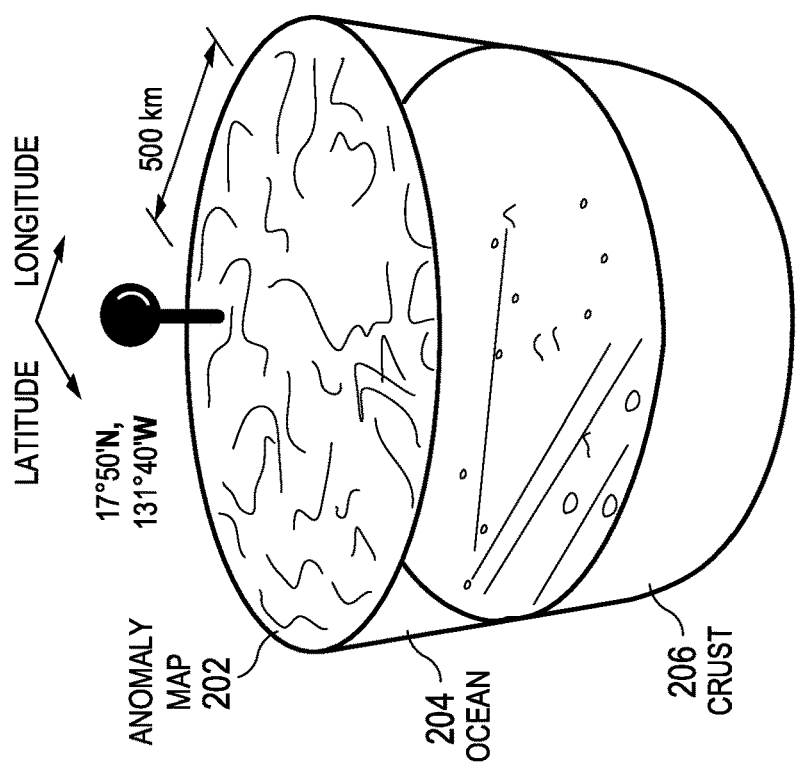
FIG. 2B
FIG. 2A

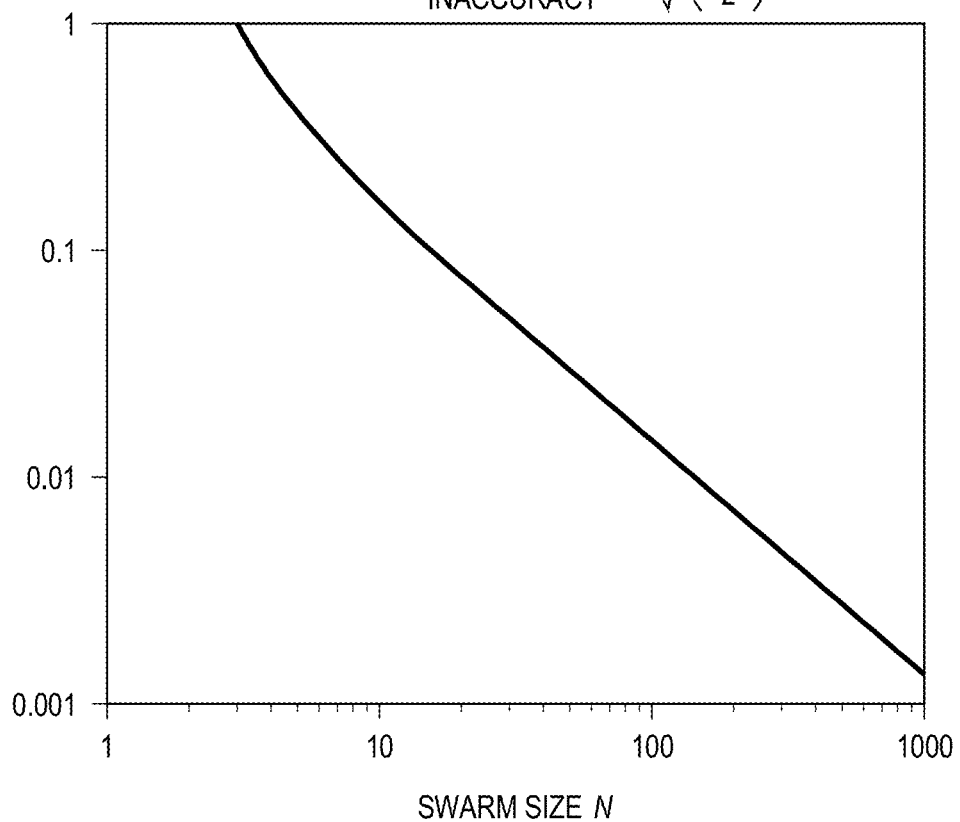

DIFFERENTIATED MULTI-AGENT NAVIGATION

CROSS-REFERENCE TO RELATED APPLICATIONS

The present application is related to U.S. utility patent application entitled "Multi-Agent Navigation" filed on the same day as this application and listing Ethan Jesse Pratt and Kyle Austin Palko as inventors and which is incorporated herein by reference in its entirety.

TECHNICAL FIELD

The present disclosure relates to computer-implemented methods, media, and systems for multi-agent navigation.

BACKGROUND

Global Positioning System (GPS) based navigation uses a constellation of satellites orbiting Earth to provide a set of coordinated references for agents navigating below. However, in GPS-denied environments, GPS cannot be relied upon by agents for navigation.

SUMMARY

The present disclosure involves computer-implemented methods, media, and systems for multi-agent navigation. In general, one innovative aspect of the subject matter described in this specification can be embodied in methods that include the actions of: receiving relative distance data specifying distance between at least one pair of agents of a plurality of agents, each of a first subset of the plurality of agents having an anomaly sensor subsystem and each of a second subset of the plurality of agents not having an anomaly sensor subsystem; determining a set of relative pose vectors based at least in part on the relative distance data; receiving anomaly data from at least one anomaly sensor subsystem of one of the plurality of agents; obtaining pre-surveyed map data; determining global pose data of the plurality of agents based on the relative distance data and based on comparing the anomaly data to the pre-surveyed map data; and assigning a task to at least one of the plurality of agents based at least in part on a specialized operational capability of the at least one of the plurality of agents.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Receiving anomaly data from the anomaly sensor subsystems can include receiving anomaly sensor data from an agent written on a carrier via modulation and the method can further include determining anomaly sensor data by demodulation of the anomaly sensor data written on the carrier via modulation. The carrier can be LIDAR.

At least one of the plurality of agents in the first subset can be configured not to have communication reception equipment. At least one of the plurality of agents in the first subset can be configured not to have communication transmission equipment.

At least one of the plurality of agents can be a balloon. At least one of the plurality of agents can be a buoy. At least one of the plurality of agents can have an anomaly sensor subsystem distanced by at least 10 centimeters but less than 2 meters from artifact-generating equipment. The method can further include maintaining a minimum virtual stinger distance between a navigating platform agent and an agent in the first subset of at least 2 meters.

At least one of the plurality of agents can be configured to have no passenger capacity. At least one of the plurality of agents can be configured to have no life-support equipment.

Embodiments of the method can be performed on a navigation platform including a navigation engine and task-relevant performance equipment. Assigning a task to at least one of the plurality of agents based at least in part on a specialized operational capability of the at least one of the plurality of agents can include providing instruction to at least one of the first subset of the plurality of agents to traverse at least one anomaly-rich region and providing instruction to at least one of the second subset of the plurality of agents to conduct a non-anomaly sensing task. The anomaly data can be at least one of magnetic anomaly and gravitational anomaly data.

The second subset of the plurality of agents can include an unmodified dynamic GPS capable agent and the method can further include at least one agent in the first subset of the plurality of agents transmitting a friendly spoofed GPS signal to the unmodified dynamic GPS capable agent, the friendly spoofed GPS signal based at least in part on data from an anomaly sensor subsystem. The second subset of the plurality of agents can include a dynamic GPS capable agent modified to receive a friendly spoofed GPS signal and the method can further include at least one agent in the first subset of the plurality of agents transmitting a friendly spoofed GPS signal to the dynamic GPS capable agent, the friendly spoofed GPS signal based at least in part on data from an anomaly sensor subsystem Receiving anomaly data from the anomaly sensor subsystems can include receiving ranging data and anomaly data using encoded magnetic field transmissions. The method can further include providing navigation instructions from a navigation agent to each other agent in the plurality of agents such that each agent maintains a distance of less than 1000 meters from at least one other agent in the plurality of agents.

The subject matter described in this specification can be implemented in particular embodiments so as to realize one or more of the following advantages. Collectively, embodiments described in this specification improve the absolute pose estimation of all agents in the dynamic swarm, compared to performance of the agents without network coordination. This improvement is achieved without relying on an external system such as landmark observations or GPS/GNSS. From their cooperative network, GPS-denied agents are now able to receive advantageous updates to estimates of their absolute pose on the map, with more accuracy than is accessible by any other means. Comparable accuracy is impossible to acquire by an independent agent or collection of non-networked agents.

Embodiments described in this specification achieve anomaly-aided absolute navigation for a cooperative network of mobile agents, without requiring each and every agent to provision all of the equipment and/or maneuvers necessary for such performance on its own independent platform. Embodiments of the present disclosure will benefit from, but notably do not require, technological advancements in anomaly and/or inertial measurement unit (IMU) sensors.

Embodiments described in this specification allow differentiated agent types in the swarm to be assigned federated operational tasks of the total mission. These distributed tasks may be optimized for each differentiated agent's specific capabilities, and/or to idiosyncratic features of an anomaly map, e.g., a magnetic anomaly map. In particular, differentiated agents may advantageously pursue those separated mission tasks that would conflict with each other if attempted by a single agent.

For example, some agents with anomaly sensor equipment may maneuver on courses that prioritize measuring the anomaly field for navigation aiding. Meanwhile, other agents with operationally-relevant equipment (cargo, passengers, etc.), may maneuver on courses that prioritize accomplishing tasks. The operations agents inherit, via network cooperation within the swarm, navigation solutions whose high accuracy ultimately derives from anomaly measurements procured by the specialized sensor agents elsewhere in the swarm.

Advantages for Retrofitting Current Platforms

By provisioning differentiated agents for missions with multi-agent anomaly sensor swarms, it is possible to convey the benefits of anomaly-aided GPS-free navigation to legacy mobile platforms (such as, for example, currently active airframe types) merely by retrofitting the platforms with equipment for relative pose estimation and cooperative network communications. These retrofits have reduced engineering and/or cost burdens compared to retrofits for magnetic anomaly sensing and high-performance IMU equipment.

Advantages of Friendly Spoofing

Many GPS-denied operational agent platforms need no retrofits at all, if accompanied by an anomaly-aided pseudolite swarm. The pseudolite swarm acquires its own global pose estimate by the methods described in this specification, and subsequently provides "friendly spoofing" to the agents' existing GPS receivers. This is especially useful for legacy agent platforms that: are too small or underpowered for anomaly sensor+IMU retrofits; and/or are incompatible with magnetic cleanliness required by magnetic anomaly sensors, Summary of Advantages In summary, compared to a non-networked collection of independent GPS-denied dynamic agents, cooperative network navigation embodiments described in this specification provide increased accuracy of GPS-free navigation in current and future fleets, using magnetic anomaly sensors and IMU equipment. This advantage is realized by significantly reduced average Size, Weight, Power, and Cost (SWaP+C) per mobile platform in a differentiated swarm, by eliminating the need for each and every agent to be equipped with its own independent anomaly sensing+IMU hardware. This advantage is realized by equipping only a specialized "anomaly aiding" subset of the swarm's mobile platforms with anomaly-sensing and/or IMU hardware. The differentiated subset of agents prioritizes dynamic operations that optimally measure the anomaly field to improve the swarm's collective navigation accuracy. These sensing agents, and their corresponding operational imperatives, may be specially configured to accommodate the demanding requirements of sensing hardware. Such accommodations could include, for example: large, magnetically and/or inertially-quiet mounting pods; substantial payload lifting capability; onboard, specially conditioned, high-capacity power supplies; and Integration of additional co-sensors for onboard calibration of platform EMI and remnant field interference signals; Integration of hardware and software for anomaly map storage, map updates, geomagnetic weather updates, and anomaly-aided navigation computations; and including calibration maneuvers in the mission planning.

In light of the above platform accommodations, these specialized agents are relieved of conflicting operational imperatives (e.g., cargo, or passenger conveyance) directed towards the swarm's overall mission. These agents may also be relieved of conflicting requirements for low-cost platform embodiments.

Additional advantages include: Easily retrofit provisioning of GPS-like mobile pseudolite signals to passive, receiver-only platforms operating in proximity to (but not necessarily as fully networked cooperating members of) an anomaly-aided mobile sensor swarm.

Advantages of embodiments described in this specification include increased overall task effectiveness via assignment of federated operational goals to differentiated mobile agents. Swarm missions may be designed with reduced regard for whether the primary task location also happens to overlap with an anomaly-rich region of the globe, if at least some sensor agents in the swarm may operate over adjacent feature-rich regions, while remaining in networked cooperation with those operational agents transiting featureless areas. Swarm missions may be designed with reduced regard for whether the speeds and altitudes of the primary operational agent(s) trajectories happen to accumulate sufficient information from anomaly field measurements to aid navigation, if at least some sensor agents in the swarm may transit specialized navigation-optimized trajectories, while remaining in networked cooperation with those operational agents who focus on the primary mission trajectories. Swarm missions may be designed with reduced regard for whether the primary operational agents can sufficiently maneuver to accumulate calibration information from those agents' remnant platform fields, if at least some sensor agents in the swarm may conduct such maneuvers and calibrations, while remaining in networked cooperation with those operational agents that focus on the primary mission objectives.

Advantages of the cloud-based navigation computer architecture: Some types of operating fleets-especially airborne and surface vessel military fleets-already employ large-SWaP+C mobile platforms, often considered "command and control" platforms. These could be readily retrofitted with substantial communication and computation equipment, to accommodate a swarm navigation computer with storage. This is the case even if these same platforms can not readily be (or do not need to be) retrofitted with anomaly sensing and/or dead-reckoning equipment. From the point of view of the agents, this would also appear to be a cloud computation architecture, just as in the case where the navigation computer is stationary. In fact, as a term of art, the airborne case may represent the ultimate use of "cloud computation."

Separating these functions from the in-swarm mobile agent platform provides utility via reduction of SWaP+C.

For example, storage requirements to accommodate highly-detailed, global-coverage anomaly maps are substantial. Such storage may need to also provision capacity for updates such as geomagnetic solar weather that varies meaningfully on intra-day timescales, and which are required for the most accurate calibrations of anomaly measurements. Additionally, computation and storage requirements for a swarm almanac are also substantial. These are driven by requirements for sufficient computational speed and storage to compute anomaly-aided updates to each mobile agent's dead-reckoning navigation filter solution. This is an intensive task in near-real time (e.g., on the order of seconds, tenths of a second, or 100ths of a second), typically requiring dedicated hardware, such as GPUs. SLAM methods demand even more computaional +storage capacity.

Furthermore, displacing such equipment from the anomaly sensor platform offers reduced EMI—and reduced remnant signal artifacts—which tend to confound anomaly sensor measurements.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

FIGS. 2A and 2B illustrate elementary components of anomaly-sensing swarm navigation, according to some implementations.

FIG. 4B illustrates a square-root performance scaling model for relative pose inaccuracy, according to some implementations.

Like reference numbers and designations in the various drawings indicate like elements.

DETAILED DESCRIPTION

Figure 1A:
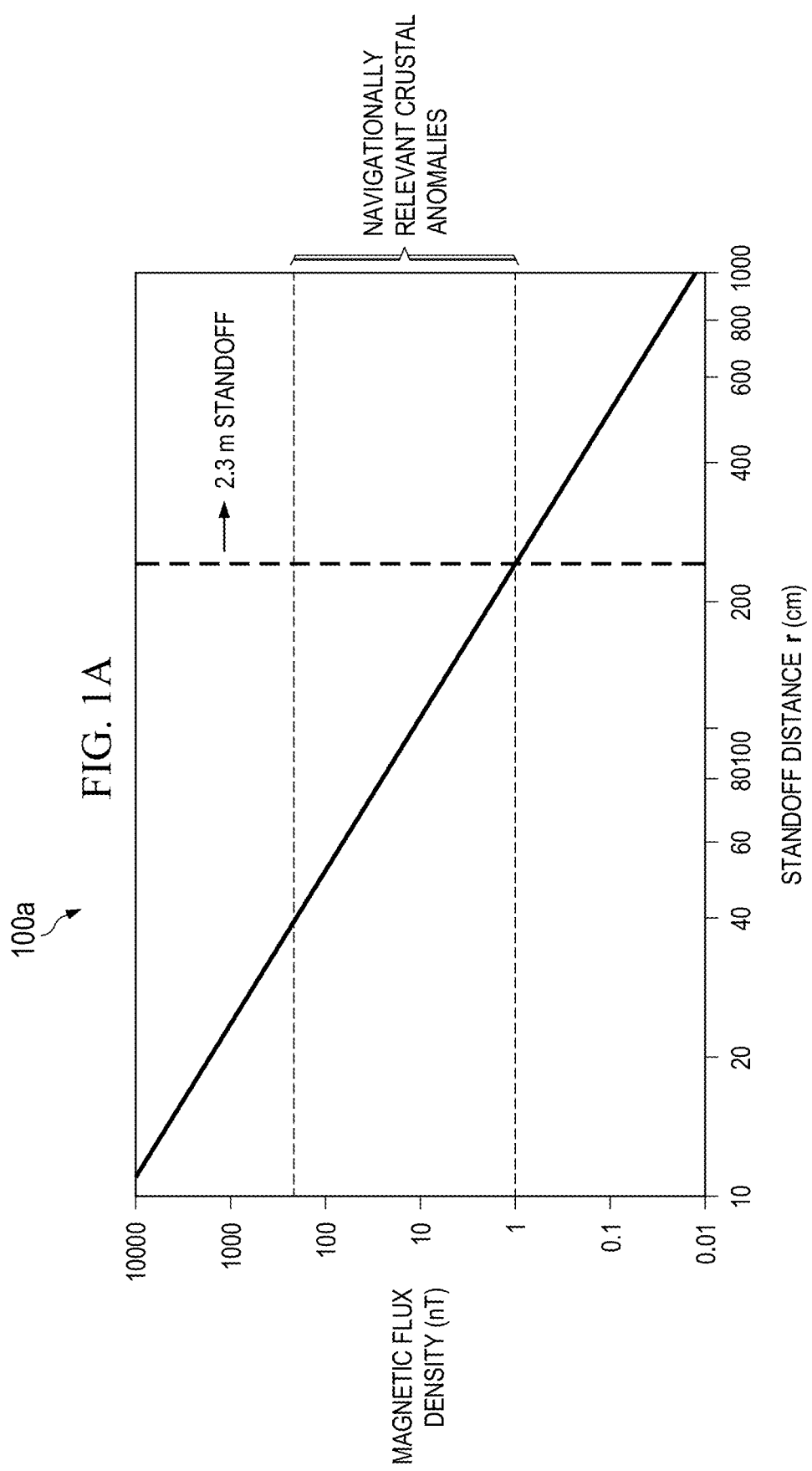
FIG. 1A illustrates an example of magnetic flux density as a function of standoff distance.

This disclosure relates to anomaly-sensing based multi-agent navigation. Multiple agents can integrate pre-surveyed anomaly field map, anomaly field sensing data, and relative distance or pose measurements between pairs of agents to aid navigation of the multiple agents, e.g., without GPS-aided navigation or at least without consistent GPS-aided navigation. Anomaly-sensing based multi-agent navigation for a cooperative network of agents can be achieved by matching distributed anomaly field sensor measurements to an anomaly field map and utilizing relative distance or pose measurements between pairs of agents to synthesize estimates of the global position of each agent.

Anomaly-sensing based multi-agent navigation can improve the absolute pose estimation of all agents in a dynamic swarm, compared to performance of the agents without network coordination. This can be achieved without relying on an external system such as landmark observations or GPS. Using a cooperative network, GPS-denied agents can receive updates to estimates of their absolute pose on the anomaly field map.

Designers of independent mobile platforms for GPS-denied missions are faced with a challenge to attain GPS-like performance with small, cheap, lightweight, low-power magnetic anomaly sensing and inertial sensing equipment package(s).

Embodiments in the current specification describe distributing equipment requirements across multiple platforms in a swarm, in order to improve sensor accuracy for those platforms tasked with anomaly measurements. The crustal magnetic anomaly features, which typically exhibit magnitudes up to several hundred nT, provide for useful navigation when the sensor measurements are accurate and resolvable in the single nT to tens of nT domain.

Magnetic artifacts typically derive from onboard ferrous objects and/or electrically powered circuits. In addition, conductive metal sheets or components (even if non-ferrous) contribute magnetic artifacts due to induced eddy current field effects caused by dynamic motion of such sheets or components relative to Earth's core magnetic field.

One way to deploy a magnetic anomaly sensor on a dynamic platform, without incurring these types of artifacts, is to place the sensor on a boom or stinger, or suspend it from a tow cable. This is done in order to physically separate the sensor from the influence of the typical platform's necessary ferrous components, powered circuits, and/or sheet metal, while maintaining a fixed known displacement of the sensor from the navigational reference point on the platform.

The reason that physical separation of the sensor dramatically impacts measurement accuracy can be understood intuitively by inspection of the Amperian loop magnetic field $\vec{H}(t)$ far from a powered electrical circuit. This is modeled as N turns of wire in a loop of area A (whose orientation encircles the z axis), carrying a current j(t) that can vary in time, at a standoff distance r from the anomaly-sensing magnetometer:

$$\vec{H}(t) = \frac{NA}{4\pi r^3} j(t) \cdot (2\hat{r} \cdot \cos\theta + \hat{\theta} \cdot \sin\theta)$$

where θ is the polar angle to the sensor, measured from the z axis. This well-known far-field approximation is valid for relatively small wire loops, where $r \gg \sqrt{A}$. For intuition building, we can ignore the details of the vector components and examine the magnitude of the on-axis (θ=0) field. In any practical case, no system would allow for carefully-engineered orientation of the magnetometer with respect to the circulation axis of onboard circuits, making the vector component details unnecessary for a useful model.

A reasonable 1 ampere circuit model employs N=100 turns of wire in a 2 cm radius loop. Such a loop model is relevant to actuators, motors, etc. As a function of standoff distance to a sensor in free space, the model then gives a magnitude of the flux density $\mu_B \cdot \vec{H}$ as shown as 100a in FIG. 1A. Although the above model is specifically parameterized as a powered electrical circuit, its consequences are also similar to those presented by ferrous materials and eddy currents.

From the Amperian loop model described above, one can observe that the field artifact is not reduced below the level of the navigationally useful crustal anomaly observations unless the magnetometer is displaced by more than 2.3 m from the source of the current. Thus survey platforms can utilize stingers, booms, or tow cables for suitable standoff.

The challenge of widely adoptable, practical, independent-agent MagNav can be interpreted as the challenge of combining the equipment requirements of a magnetically inert survey craft with the requirements of many types of operational platforms—all of which have been designed with accommodations only for the benign requirements of a compact GPS receiver.

Unfortunately, most operationally relevant platforms (cargo/passenger ships, planes, submarines, etc.) do not allow the use of booms, stingers, or tow cables. The high-performance equipment onboard such platforms-often powerful, aerodynamic, highly ferrous, and/or highly conductive-impedes design options that would significantly displace the onboard anomaly sensor from its magnetic artifact sources.

Instead, such platform types require sophisticated calibration methods that subtract the large artifact fields from the measurements. With sufficiently accurate calibration, the underlying crustal anomaly magnitudes can be revealed and used for navigation, even on compact and/or heavily-artifacted platforms.

As can be seen in the model above however, such calibration performance requirements can be extreme. On small or densely instrumented platforms, with standoff distances in the few cm to 10 s of cm domain, the artifact fields can easily exceed the crustal anomaly measurements by factors of 100 s to 1000 s. Resolving true anomaly measurements against this level of background is a formidable challenge.

The present specification describes the utility of displacing anomaly sensors far from the disrupting extent of artifact fields on mobile operational platforms, to enhance navigation performance by decreasing the platform noise effects on the sensors. Such a reduction in platform noise conveys an advantage that can be utilized with lower-Size, Weight, Power, and Cost (SWaP+C) anomaly sensors, reduced equipment requirements for calibration, and/or reduced IMU requirements.

Figure 1B:
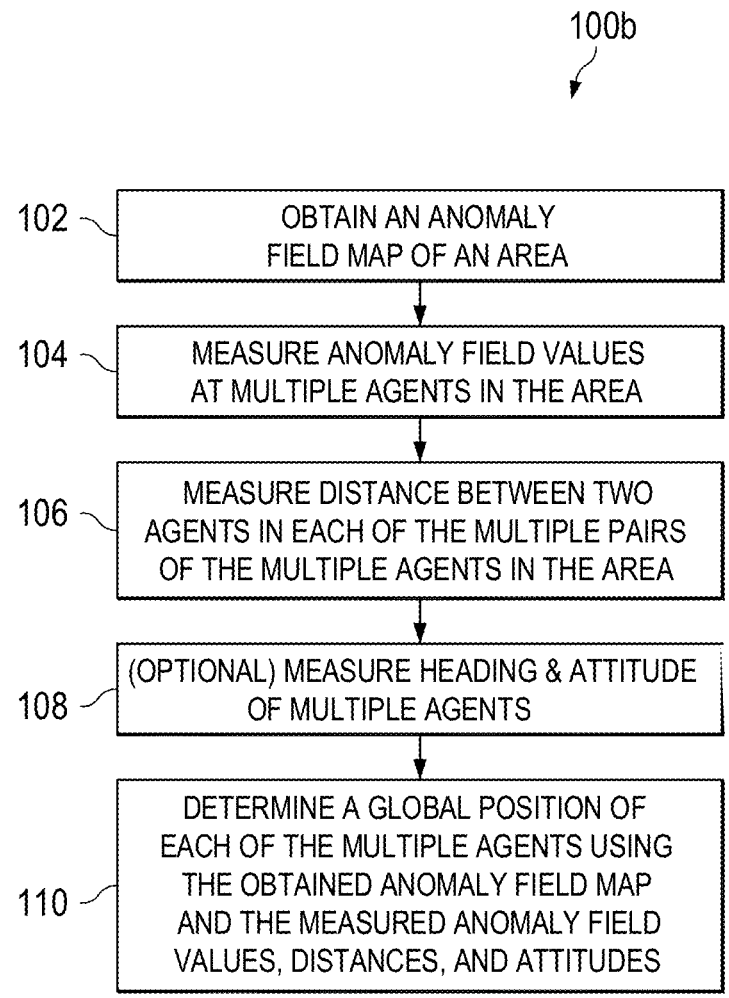
FIG. 1B illustrates an example process for anomaly-sensing based swarm navigation, according to some implementations.

FIG. 1B illustrates an example process 100b for anomaly-sensing based swarm navigation. For convenience, process 100b will be described as being performed by a computer system having one or more computers located in one or more locations and programmed appropriately in accordance with this specification. An example of the computer system is the computing system 900 illustrated in FIG. 9 and described later.

At a high level, process 100b can be described as follows. In steps 102 to 108, a computer system obtains an anomaly field map (e.g., a magnetic field map or a gravitational field map) of an area, measurement data of the field at multiple agents in the area, measurement data of distance between two agents in each of multiple pairs of agents of the multiple agents, and heading and attitude (i.e., pitch and roll) data of each of the multiple agents. At step 110, the computer system determines global position data of each of the multiple agents using the anomaly field map of the area, the anomaly field data, the distance data, and the heading and attitude data obtained in steps 102 to 108. An example anomaly field map is shown in FIG. 2A. Three example agents, together with their relative pose measurements, are shown in FIG. 2B. The multiple agents in the area can be collectively described as a swarm, and anomaly-sensing based swarm navigation refers to determining the global position of each of the multiple agents in the swarm in step 108 using the anomaly field map of the area, the anomaly field data, and the distance data obtained in steps 102 to 108.

More specifically, at step 102, a computer system obtains an anomaly field map of an area. Examples of an anomaly field map include a magnetic field map and a gravitational field map. FIGS. 2A and 2B illustrate elementary components of anomaly-sensing swarm navigation, including anomaly field map 202 in FIG. 2A. FIG. 2A shows an example section of Earth's crust 206 and Pacific Ocean 204 surface. The pre-surveyed magnetic anomaly map is overlaid, with coordination to latitude+longitude. This area includes approximately $10^6$ $km^2$ of surface. The ocean depth is approximately 5.3 km at this location. FIG. 2B shows an example anomaly-sensor swarm, composed of three agents, operating over the same area as in FIG. 2A. In FIG. 2B, Agent 1 is airborne at 4 km altitude. Within its horizon, Agent 1 has line-of-sight visibility to surface Agents 2 and 3. This visibility can enable relative pose measurements $\Delta r_{2,1}$ and $\Delta r_{3,1}$, which includes the distance between two agents in each pair of the three agents. Coastline landmarks cannot be sighted by the three agents at this map location.

Returning to FIG. 1B, at step 104, the computer system receives anomaly field data at each of multiple agents in the area, which can be generated using e.g., magnetic or gravitational anomaly sensor subsystem onboard each of the multiple agents. The magnetic anomaly sensor can be a magnetometer such as: 1. a scalar optically pumped magnetometer (OPM) including an alkali vapor OPM, or 2. a vector atomic magnetometer including a nitrogen-vacancy diamond (NVD) sensor. The anomaly field sensor subsystem can consist of more than a field sensor. It can include auxiliary calibration sensors and a local calibration computer, to provide at specified time instants an estimate for the true local field, while mitigating platform interference to the measured anomaly field data.

At step 106, the computer system receives distance data between two agents in each of multiple pairs of agents of the multiple agents. In some implementations, distance data between two agents can be measured using time-of-flight (TOF) ranging devices. Many operational fleet types make use of time-stamped messaging protocols that enable TOF-based scalar relative distance measurements.

Optionally and in certain embodiments, at step 108, the computer system receives heading, altitude and attitude data of each agent of the multiple agents. In some implementations, the heading, altitude and attitude data can be provided by a system that uses acceleration and rotation data from one or more inertial measurement units (IMUs) onboard each of the multiple agents to generate the heading and attitude data, without use of GPS. The heading and attitude data of each agent form three-dimensional (3D) rotational vectors. Attitude (i.e., pitch and roll), altitude and heading can also be used by an agent to establish a local vector coordinate system for relative pose measurements between agents, and can be used to orient an agent to the anomaly field map obtained in step 102. In other embodiments, the system does not receive heading, altitude and attitude data or receives only one or two of heading, altitude and attitude data or receives heading, altitude and/or attitude data for only some of the agents.

An agent's rigid-body platform pose can be specified at time/by the combination of the platform's 3D angular orientation, which includes {heading(t), pitch(t), and roll(t)}, and its 3D vector location r(t). Altitude can be estimated without GPS by using anomaly aiding, yet this can become challenging because the anomaly field yields low spatial information for upward/downward transits. Altitude can also be measured by alternative means, for example, with a barometer or sea-floor ranging device. For agents on the ocean surface, altitude can be estimated by assumption.

Figure 7:
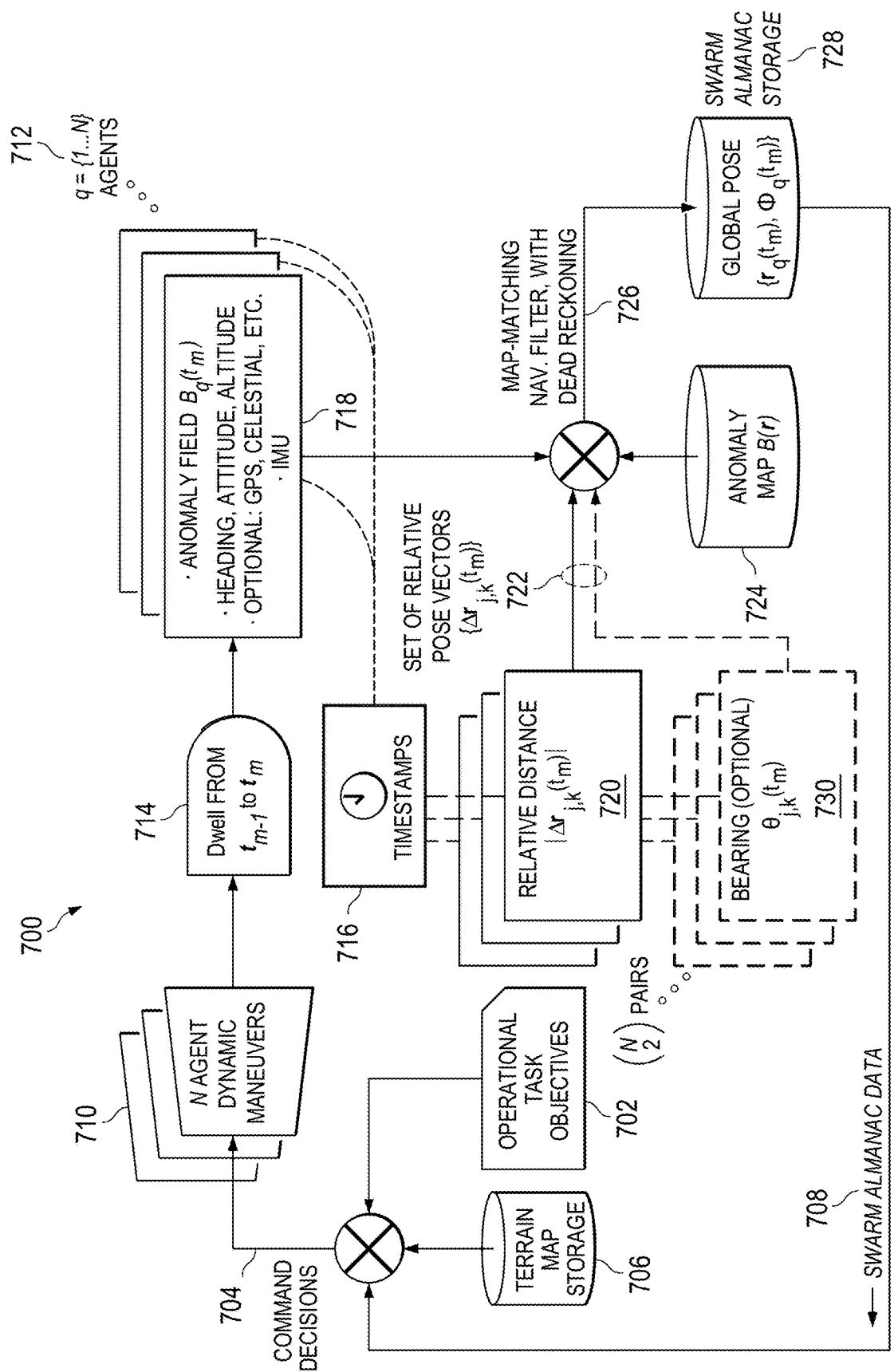
FIG. 7 illustrates an example of a navigation filter and its input and output data for anomaly-sensing based swarm navigation, according to some implementations.

At step 110, the computer system determines a global position of each, or at least some, of the multiple agents using the anomaly field map of the area, the anomaly field data, the distance data, and the heading and attitude data received in steps 102 to 108. This determination of the global position of an agent can be performed by a filter, for example, a navigation filter. An example navigation filter 726 is shown in FIG. 7. FIG. 7 illustrates an example 700 of a navigation filter and its input and output data for anomaly-sensing based swarm navigation. In some implementations, the multi-agent anomaly-sensing based swarm navigation includes map-matching of distributed mobile anomaly sensor data, constrained by time-stamped distance measurements between pairs of the distributed mobile platforms, as described below.

A navigation filter, e.g., navigation filter 726 can use the anomaly field map of the area retrieved from anomaly map storage 724, anomaly field data in data set 718, and distance data 720 as filter measurement input data to estimate global pose of the swarm. The navigation filter can reduce the errors in each of the multiple agents' global position, heading, and attitude (i.e., pitch and roll) that are estimated by the navigation filter based on the heading and attitude data received in step 108. More specifically, anomaly field data from an agent can be compared to anomaly field value from a location in the anomaly field map that corresponds to the location of the agent, and the difference from the comparison can be used to reduce the error in global position of each of the multiple agents estimated by the navigation filter. Additionally, the distance data between two agents in each of multiple pairs of agents of the multiple agents, measured by, for example, TOF ranging devices onboard the two agents, can also be used as filter measurement input data to reduce the error in each of the multiple agents' global position that is estimated by the navigation filter.

The navigation filter 726 can use the anomaly field map of the area, the anomaly field data, and the distance data as filter measurement input data for incremental steering updates to dead reckoning. In some implementations, the initial global position, heading, and attitude of each of the multiple agents can be initialized to a specified accuracy by some methods, at some point in the past. The steering updates can then aid the navigation filter during the loss of GPS.

In some implementations, once the anomaly field map-coordinated global position is estimated for each of the multiple agents in the swarm, the relative bearing angles between two agents in each pair of the multiple agents can be determined from the estimated global positions of the multiple agents.

In some implementations, at step 106, instead of receiving distance data between two agents in each of multiple pairs of agents of the multiple agents, the computer system can receive relative pose data between two agents in each of multiple pairs of agents of the multiple agents. This can further reduce the error in determined global position of each agent at step 110. Relative pose data is 3D displacement vector measurement time-series data between agents in pairs, denoted by, for example, $\Delta r_{j,k}(t)$ for the pair formed by two agents indexed as j and k. These vector measurements include two parts: relative scalar range $|\Delta r_{j,k}(t)|$ and bearing $\theta_{j,k}(t)$ between agents j,k in a pair. Bearing includes both angles that comprise relative orientation between two points: relative azimuth and relative angle of elevation/depression. Relative pose data can be provided by directed ranging equipment such as microwave ranging (MWR), or LIDAR/RADAR/SONAR.

In some implementations, an anomaly-aided swarm can accumulate navigation solutions by cooperative information sensing, storage, computational processing, and communication functions. Table 1 below describes these functions in columns. Rows describe associated specific "agent types," each of which is equipped with certain particularly advantageous minimal combinations of the functions.

TABLE 1

| | | Sensing | | | | Processing | | | | Comms. | |
|---|---|---|---|---|---|---|---|---|---|---|---|
| Swarm agent type | Agent description | Heading, attitude, & altitude | IMU | Relative pose | Anomaly field | Anomaly map storage | Nav. compute & terrain storage | Swarm almanac Storage | Swarm almanac Compute | Rx | Tx |
| Swarm prodigy | Equipped with all capabilities | ✓ | ✓ | ✓ | ✓ | ✓ | ✓ | ✓ | ✓ | ✓ | ✓ |
| Anomaly-aided pseudolite + | Navigates and communicates | ✓ | ✓ | ✓ | | | | | | ✓ | ✓ |
| Navigation computer + | Computes time-series of pose estimates | | | | | ✓ | ✓ | ✓ | ✓ | ✓ | ✓ |
| | Measures | | | | ✓ | | | | | | ✓ |

TABLE 1-continued

| Swarm agent type | Agent description | Sensing | | | | Processing | | | | | |
|---|---|---|---|---|---|---|---|---|---|---|---|
| | | Heading, attitude, & altitude | IMU | Relative pose | Anomaly field | Anomaly map storage | Nav. compute & terrain storage | Swarm almanac Storage | Swarm almanac Compute | Comms. Rx | Comms. Tx |
| Sensor drone | anomaly field along its course | | | | | | | | | | |
| Operations agent | Passive navigator receiving swarm pseudolite signals | | | ✓ | | | ✓ | ✓ | | ✓ | |

In some implementations, the anomaly-sensing based swarm navigation illustrated in FIG. 1B can include a look-up function that compares mobile anomaly sensor readings to the pre-surveyed anomaly field map. The pre-surveyed anomaly field map data can be stored on media with access speed for computation involved in anomaly-sensing based swarm navigation. The pre-surveyed anomaly field map data can also be updatable. Example map data updates include solar weather data, Simultaneous Localization and Mapping (SLAM) map data, new external survey data, periodic revisions of Earth's core field model data, or downward and upward continuation data to accommodate operating altitude of the agents.

In some implementations, a dead-reckoning navigation system, uses an operational map and anomaly aided steering updates, IMU data, and other information as available, to estimate and predict the pose of agent(s). Although the positional components of this pose estimate are also contained in the swarm almanac, operational agents may need additional capacity to compute and store their orientation, or compute other navigational (e.g., "terrain") aspects of their local situation for task completion.

In some implementations, the time-series set of 3D vector locations $\{r_q(t)\}$, indexed for agents q=1 . . . . N, is collectively described as the swarm almanac. A set of 3D vector locations with bearing can also be described as the global pose of the network. As noted above, the global pose can be determined based at least in part on absolute locations on the anomaly field map. The swarm almanac time-series can be stored in media for access by agent types who request the data.

In some implementations, the cooperative information sensing and processing functions of the multi-agent swarm include communication. Agent subtypes can be equipped with bidirectional communication capacity, with some exceptions. For example, some sensor drones do not need to receive transmissions. Their roles are to measure the anomaly field at its location and transmit that sensor data to the swarm. Such an agent's platform relative pose can be estimated by other agents in the swarm. In another example, a differentiated swarm system type can derive special utility from its sensor drone agent member(s) and therefore does not need to receive transmissions. In some implementations, in the case of an agent type that must not exhibit any overt or active communication signatures, the agent type does not need to transmit data. Passive operations agents can benefit from the anomaly-aided pseudolite signals. But they may not be fully cooperative members of the swarm. In another example, a differentiated swarm system type that derives special utility from deploying passive operations agents does not need to transmit data.

In some implementations, the underlying physical field of the anomaly field is a 3D vector field, denoted, for example, as B. This is the case for the magnetic anomaly field. Nonetheless, surveys of the magnetic anomaly field can be conducted with scalar sensors, which report the scalar magnitude |B| of the anomaly field. The resultant anomaly maps are scalar anomaly maps $B(r)=|B(r)|$.

In some implementations, vector anomaly field maps B (r) can be decomposed into three orthogonally oriented, coordinated scalar maps denoted by the set $\{B_x(r), B_y(r), B_z(r)\}$. Vector anomaly-aided swarms using 3D vector anomaly field maps can include agents equipped with vector anomaly sensors and orientation (i.e., heading and attitude) sensors. Each of the decomposed-by-component field map and sensor data can then be processed separately using the same methods that presume scalar anomaly field maps and scalar sensor data. The navigation computer, for example, navigation filter 726 in FIG. 7, can combine the separate results.

As shown in Table 1, the swarm prodigy agent type can include three distinct agent subtypes: the anomaly-aided pseudolite, the navigation computer, and the sensor drone. The collective functions of a swarm prodigy agent type are enabled by its composition of the subtypes, with intercommunication between the agents.

In some implementations, high-capacity communication equipment can compensate for removal of local storage and computation equipment from mobile agent platforms. This can be a cloud architecture for the navigation computer, which may be equipped at a stationary, remote location. The data and computations at the navigation computer can be accessed by the swarm, via communication capacity.

In some implementations, the navigation computer can be mobile and equipped on a large sensor size, weight, power, and cost (SWaP+C) mobile platform that accompanies the swarm, while not acting as a fully cooperative anomaly navigating member of the swarm.

In some implementations, communication equipment can accommodate swarm capabilities with functionally separated platforms.

In some implementations, swarm prodigy agents may be either self-contained mobile platforms or platforms with separated navigation storage and computation functions. These implementation choices do not affect the functional equivalence of the described swarm systems.

Figure 3A:
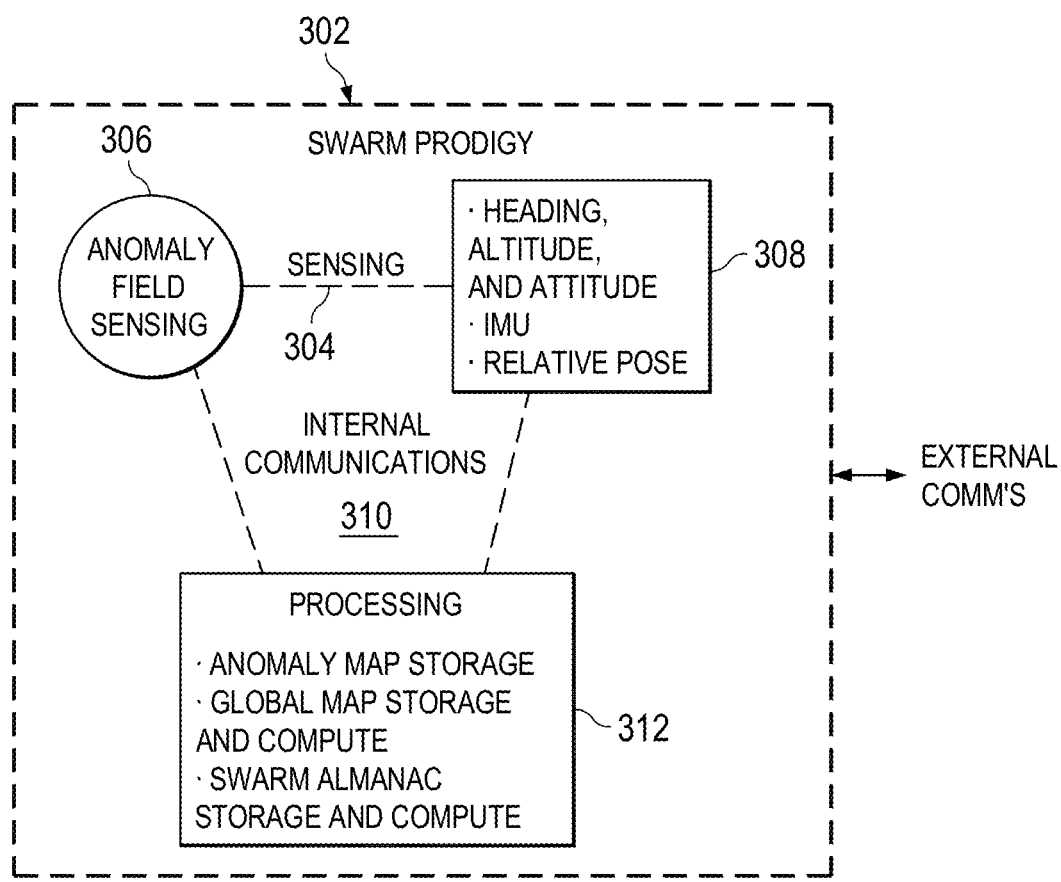
FIGS. 3A and 3B illustrate swarm prodigy functions shown in Table 1, according to some implementations.
Figure 3B:
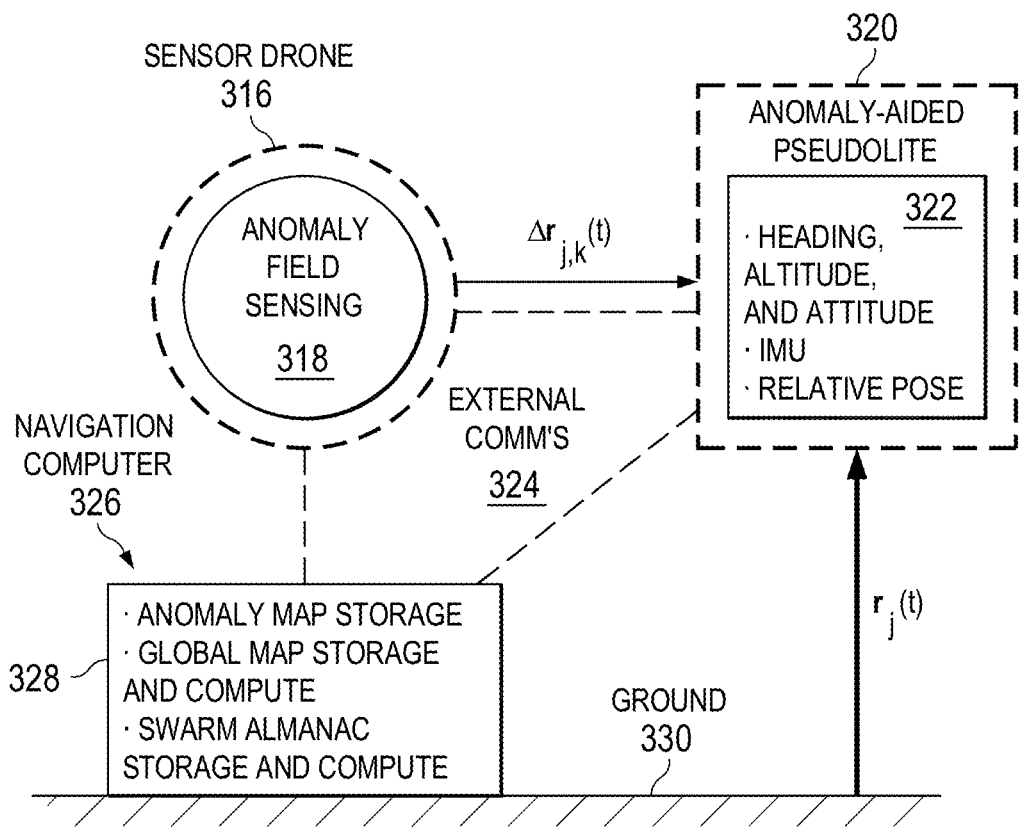

FIGS. 3A and 3B illustrate swarm prodigy functions shown in Table 1. Communication channels 310, 314 and 324 are indicated by dashed lines. FIG. 3A shows functional composition of a self-contained prodigy mobile platform 302, with all capabilities according to Table 1. The illustrated swarm prodigy 302 includes sensing components 304 including anomaly field sensing 306, heading, altitude, attitude, IMU and relative pose determination 308, internal communications 310, processing 312 and external communications 314. FIG. 3B shows identical functions, distributed on two mobile agent subtypes: sensor drone 316 and anomaly-aided pseudolite 320, with cloud communication to the third (not necessarily mobile) subtype: navigation computer 326. Solid arrows indicate the global pose of the pseudolite 320, and relative pose of the sensor drone 316.

A swarm type includes at least two agents. A cooperative mobile anomaly sensor swarm of size N requires a minimum of N−1 unique relative pose measurements or distance measurements between pairs, with every agent platform measured at least once.

In some implementations, a subset of partially-redundant relative pose or distance measurements, which go beyond the minimal set, can include some individual member agents that are already members of other pairs in the minimal set. The maximum possible number of unique relative pose measurements is (N choose 2). Optional measurements can increase accuracy of the network pose estimate. The subset size is (N choose 2)−(N−1)=(N−1 choose 2). This increases with increasing swarm size N. By including as many optional measurements as possible, larger swarms can attain correspondingly improved pose estimation accuracy than smaller swarms.

For example, for a single 3-agent swarm, there are two minimum measurements, and only one optional. For a cooperative 9-agent swarm, there are 8 required measurements, and 28 optional. Therefore, as an example, every agent in a fully-measured 9-agent swarm would inherit improved pose accuracy compared to any agent in three (disconnected) subset 3-agent swarms. This is because the optional measurement set size is much larger in the connected case.

Figure 4A:
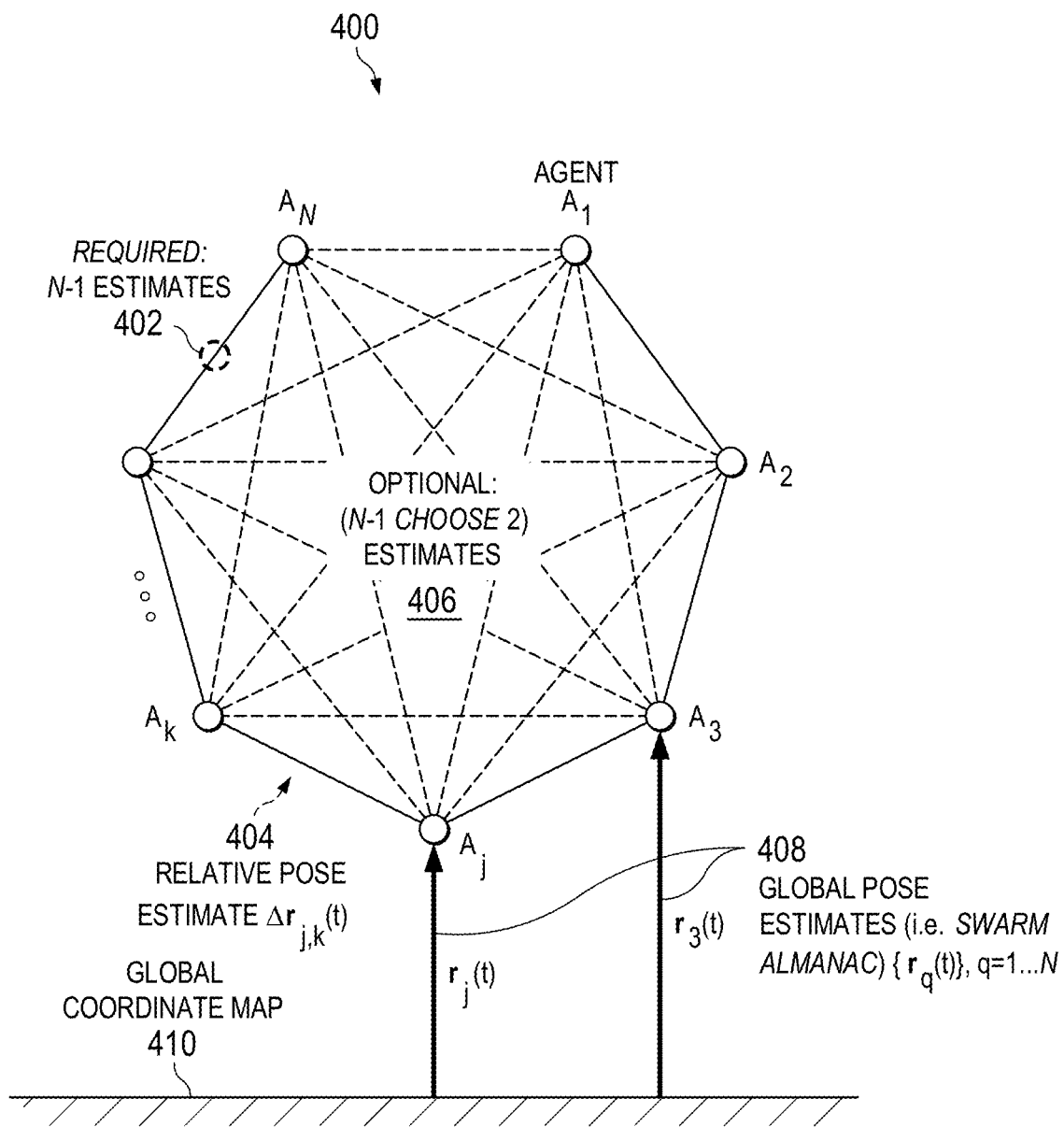
FIG. 4A illustrates composition and nomenclature for an N-agent swarm, according to some implementations.

FIG. 4A illustrates composition and nomenclature for an N-agent swarm. FIG. 4A illustrates both the required N−1 unique relative pose estimates and the optional (N−1 chose 2). FIG. 4B illustrates a square-root performance scaling model for relative pose inaccuracy, based on the size of the optional pose measurement set, with uncorrelated relative pose or distance measurements. No anomaly measurements or map-matching functions are taken into account in FIG. 4B.

In some implementations, a swarm with multiple agents can be described as a homogenous swarm when it is composed of two or more identical agents of the swarm prodigy type. Any agent or agents in a homogeneous swarm may perform any or all of the information storage, communication, and computation functions required collectively for the network. All agents are equipped to measure the anomaly field at their location. Every agent is further equipped to navigate by dead reckoning, with anomaly aided updates to its own and other agents' global pose estimate(s). A homogenous swarm that satisfies the above pose measurement requirements, and which acquires all N possible anomaly field measurement time-series, can be described as a fully cooperative swarm.

In some implementations, homogenous swarm type can provide flexibility to goal planners, who may assign tasks to the swarm without concern for individual agent capabilities. When deploying subsets of a fleet as operational swarms, provisioning agents from an identical fleet furthermore provides for task-assignment redundancy as any task may be attempted by any agent(s), and agent replacement capacity.

In some implementations, a homogeneous swarm can conduct autonomous flocking operations in GPS-denied areas. "Flocking" describes that the individual agent courses and specific objectives are not fully planned in advance, but are instead defined by cooperative updates during the operation. These updates can include emergent information from trajectories of other agents in the swarm, as well as progress towards objectives and unforeseen impediments.

In some implementations, flocking algorithms can be more efficient to compute for collective agents with identical capabilities. Therefore, a homogeneous swarm type can enable higher-speed dynamics and larger flock numbers than a similarly equipped swarm with differentiated agents.

In some implementations, in a cold-start scenario, a multi-agent swarm does not yet have IMU data to steer an ongoing navigation solution. Without GPS or landmark observation, the initial pose estimation problem is challenging. Multi-agent anomaly-aided map-matching can be used to provide a cold-start initial estimation of global position for each agent in the swarm, at a notional starting time t0.

As an example, Table 2 below shows initial representative values of measurement data from GPS-free sensors for cold-start in anomaly-sensing based swarm navigation of the three agents in FIG. 2B over the Pacific Ocean surface shown in FIG. 2A. Data in Table 2 can be acquired without GPS or terrain feature identification.

TABLE 2

| GPS-free sensor type (examples) | Measurement type | Initial measurements | | |
|---|---|---|---|---|
| | | Agent 2 | Agent 1 | Agent 3 |
| Magnetometer | Anomaly field | 10 ± 5 nT | −25 ± 10 nT | 95 ± 10 nT |
| Anomaly map | Map-matching (See FIG. 2A and FIG. 5) |  |  |  |
| Magnetic compass, celestial imaging | Heading | — | 0° (i.e. North) | — |
| Horizon sighting, tip/tilt acceleration. | Attitude | — | 0° pitch, 0° roll (i.e. level) | — |
| Barometer, LIDAR | Altitude (MSL) | 0 m (i.e. surface) | 4 km | 0 m (i.e. surface) |

TABLE 2-continued

| | | Initial measurements | | |
| --- | --- | --- | --- | --- |
| GPS-free sensor type (examples) | Measurement type | Agent 2 (⬠) | Agent 1 (○) | Agent 3 (◇) |
| LIDAR, TOF inference | Relative vector pose w.r.t. $A_1$ (East, North, Altitude) | $\Delta r_{2,1}$ = (−98, 0, −4) km | | $\Delta r_{3,1}$ = (0, 217, −4) km |

Based on the sensor measurement data information in Table 2, the computational step of cold-start in anomaly-sensing based swarm navigation can be performed to estimate the global position of each of the three agents. This example uses stepwise n-particle joint filters on the map section near latitude/longitude (17°50'N, 131°40'W).

Table 3 shows the global positioning areal uncertainty per agent. When compared to independent-agent (1-particle) anomaly-aided navigation, the joint information provided by multiple agents sampling the anomaly field on long baselines significantly reduces the positioning uncertainty. As shown in Table 3, all three agents inherit the same final uncertainty, even though Agent 1 is transiting a substantially featureless area of the anomaly field map.

TABLE 3

| | | Global positioning areal uncertainty, per agent | | |
| --- | --- | --- | --- | --- |
| Multi-agent map matching step # | Description | Agent 2 (⬠) | Agent 1 (○) | Agent 3 (◇) |
| 1 | Unfiltered circular map: 1,128 km dia. | | $1 \times 10^6$ km$^2$ | |
| 2 | 1-particle filter | 44,100 km$^2$ | 55,225 km$^2$ | 3,564 km$^2$ |
| 3 | Joint 2-particle filter | 2,254 km$^2$ | | 1,149 km$^2$ |
| 4 | Joint 3-particle filter | | (9.4 km)$^2$ = 88 km$^2$ | |

Figure 5:
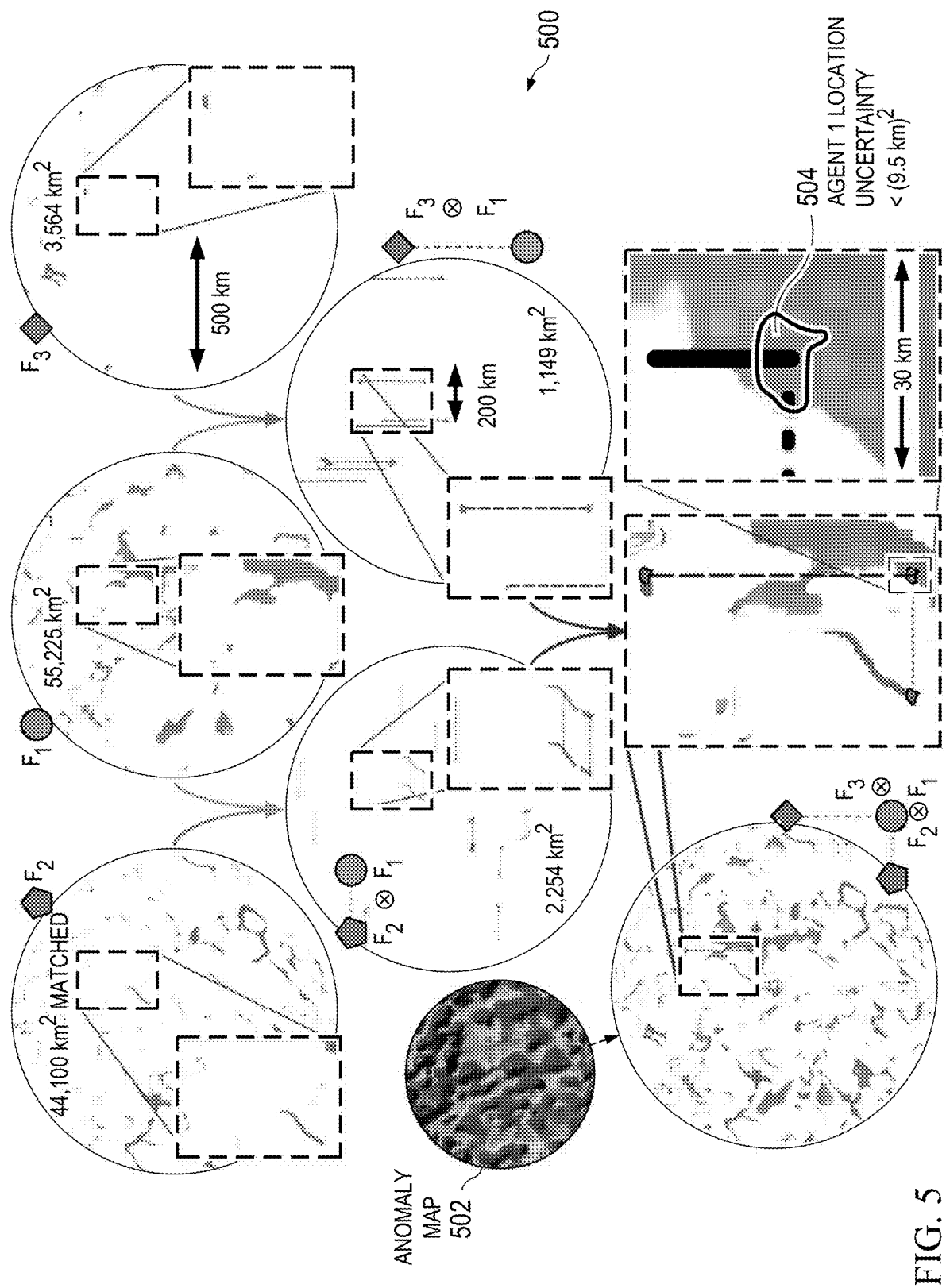
FIG. 5 illustrates a cold-start example of multi-agent anomaly map-matching applied to the example map from FIG. 2A, according to some implementations.

FIG. 5 illustrates a cold-start filter example 500 of multi-agent anomaly map-matching applied to the example map from FIG. 2A using the agents from FIG. 2B. Agent 1 in FIG. 2B (labeled F1 in FIG. 5) is the agent up in the air in FIG. 2B that has line of sight to agents 2 and 3 in FIG. 2B (labeled F2 and F3, respectively, in FIG. 5). With reference to FIG. 5, in example 500, there is no terrain in sight near this Pacific Ocean location. Subplots in the top row show the results from single-particle filters for each of the three agents (F1, F2, and F3 in FIG. 5 and agents 1, 2 and 3 in FIG. 2B). Each agent makes a magnetic field measurement. Once the agents make their measurement, the system searches for portions of the magnetic field map that match the measured value. Instead of showing the number of nanoTesla (nT) measure by each agent and reflected in table 2 above, each map associated with each agent in the top row of FIG. 5 simply shows the regions that have the magnetic field value measured by that agent, i.e., all the areas of the map that match the specified nT reading with the specified uncertainty. Agent F1 has quite a large area (55,225 square km) that matches the F1 nT setting, agent F2 has a slightly smaller area (44,100 square km) that matches the F2 nT setting and agent F3 has the smallest area ((3,564 square km) of the three agents. Subplots in the middle row of FIG. 5 show the results from joint 2-particle filters, which combine relative pose and anomaly field measurements. In other words, the system determines, constraint F1×F2, where the swarm could be to take into account the joint constraint such that agent 1's magnetic field measurement is true and agent 2's magnetic field measurement is true and the relative pose of agent 1 and agent 2 is true (perhaps a dozen possible locations). Similarly, the system determines, constraint F1×F3, where the swarm could be to take into account the joint constraint such that agent 1's magnetic field measurement is true and agent 3's magnetic field measurement is true and the relative pose of agent 1 and agent 3 is true (perhaps a half dozen locations). Subplots in the bottom row of FIG. 5 show results from joint 3-particle filter, resulting in unique location estimates for each of the three agents in FIG. 2B. Now the system searches for spots that meet both constraint F1×F2 and F1×F3. Here one can see the performance enhancement of the joint constraint, where the locations of all agents in the swarm are jointly determined accurately, each with uncertainty less than 9.5 square km. Furthermore, the performance can be much better than this illustrative example.

Figure 6:
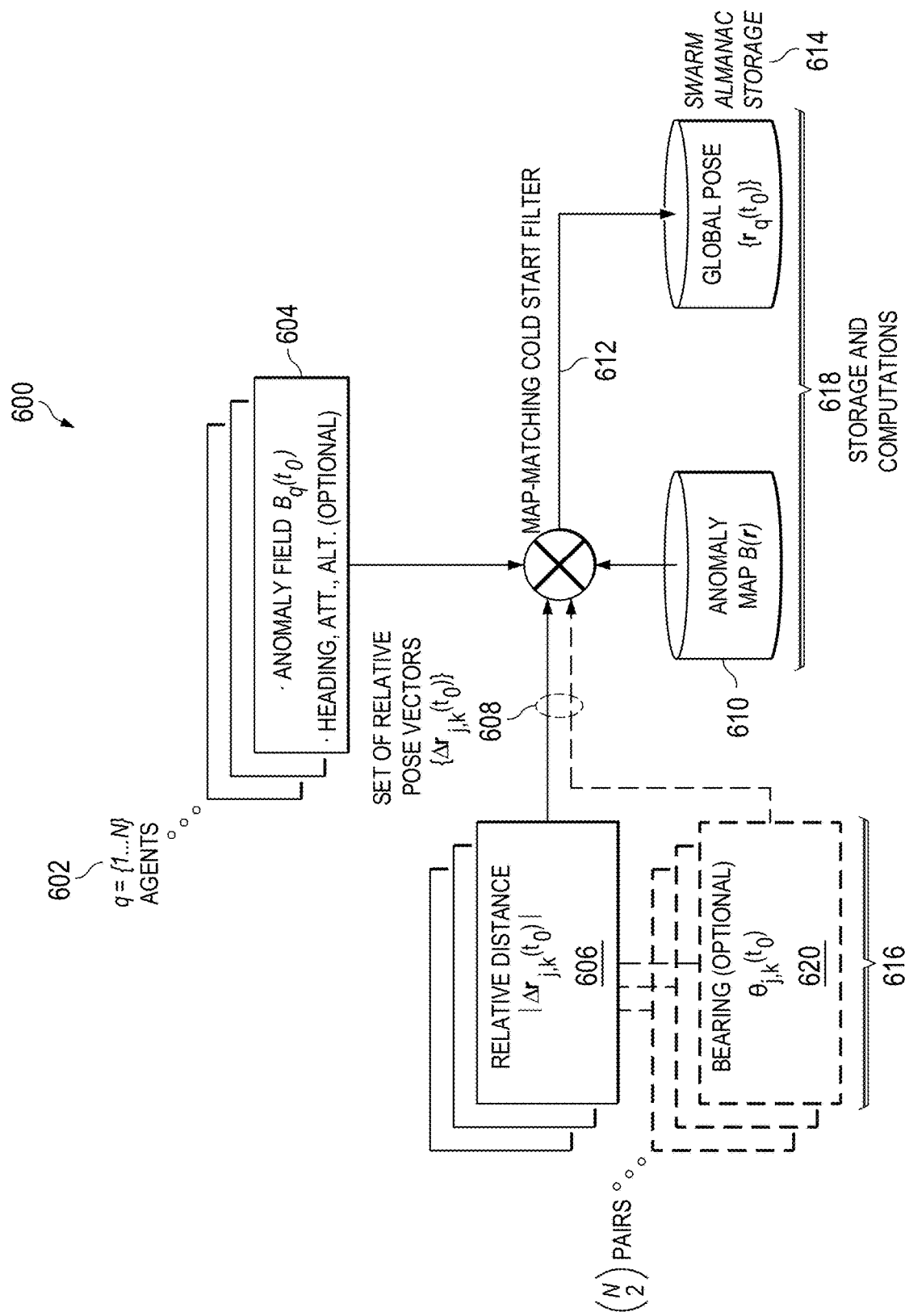
FIG. 6 illustrates an example of the information flow for a map-matching based cold-start of a multi-agent swarm, according to some implementations.

FIG. 6 illustrates an example 600 of the information flow for a map-matching navigation filter with dead reckoning that can be used to perform cold-start navigation of a multi-agent swarm. Anomaly map-matching can be used to provide a cold-start initial estimation of global pose for each agent in the swarm, at a notional starting time t0. Similar to FIG. 7 described earlier, the map-matching navigation filter 612 can use the anomaly field map of the area retrieved from anomaly map storage 610, the anomaly field data and heading attitude and altitude for each of a set of agents 602 in data set 604, and the relative distance data 606 as filter measurement input data to estimate global pose. The filter can use bearing information 620 in combination with relative distance data 606 to produce a set of relative pose vectors and can use the combination of the bearing data 620 and relative distance data 606 to reduce errors in each of the multiple agents' global position, that is estimated by the navigation filter.

As noted above, FIG. 7 illustrates a navigation system including a navigation filter, e.g., navigation filter 726, that can use the anomaly field map of an area retrieved from anomaly map storage 724, anomaly field data in data set 718, and distance data 720 as filter measurement input data to estimate global pose of the swarm. More specifically, anomaly field data from an agent can be compared to anomaly field value from a location in the anomaly field map that corresponds to the location of the agent, and the difference from the comparison can be used to reduce the error in global position of each of the multiple agents estimated by the navigation filter. Additionally, the distance data between two agents in each of multiple pairs of agents of the multiple agents, measured by, for example, TOF ranging devices onboard the two agents, can also be used as filter measurement input data to reduce the error in each of the multiple agents' global position that is estimated by the navigation filter.

The global pose data/swarm almanac data 708 can be provided as input along with operational task objectives 702 and terrain map data 706 to a decisions engine 704. The decisions engine 704 can then provide dynamic maneuvers instructions 710 to at least some of the agents. After some period of time 714 the process starts again. In order to ensure the system is syncing various measurements for various agents 712, e.g., anomaly measurements by agents and pose measurements of those same agents, the system 700 applies time stamps during various measurements.

Figure 8:
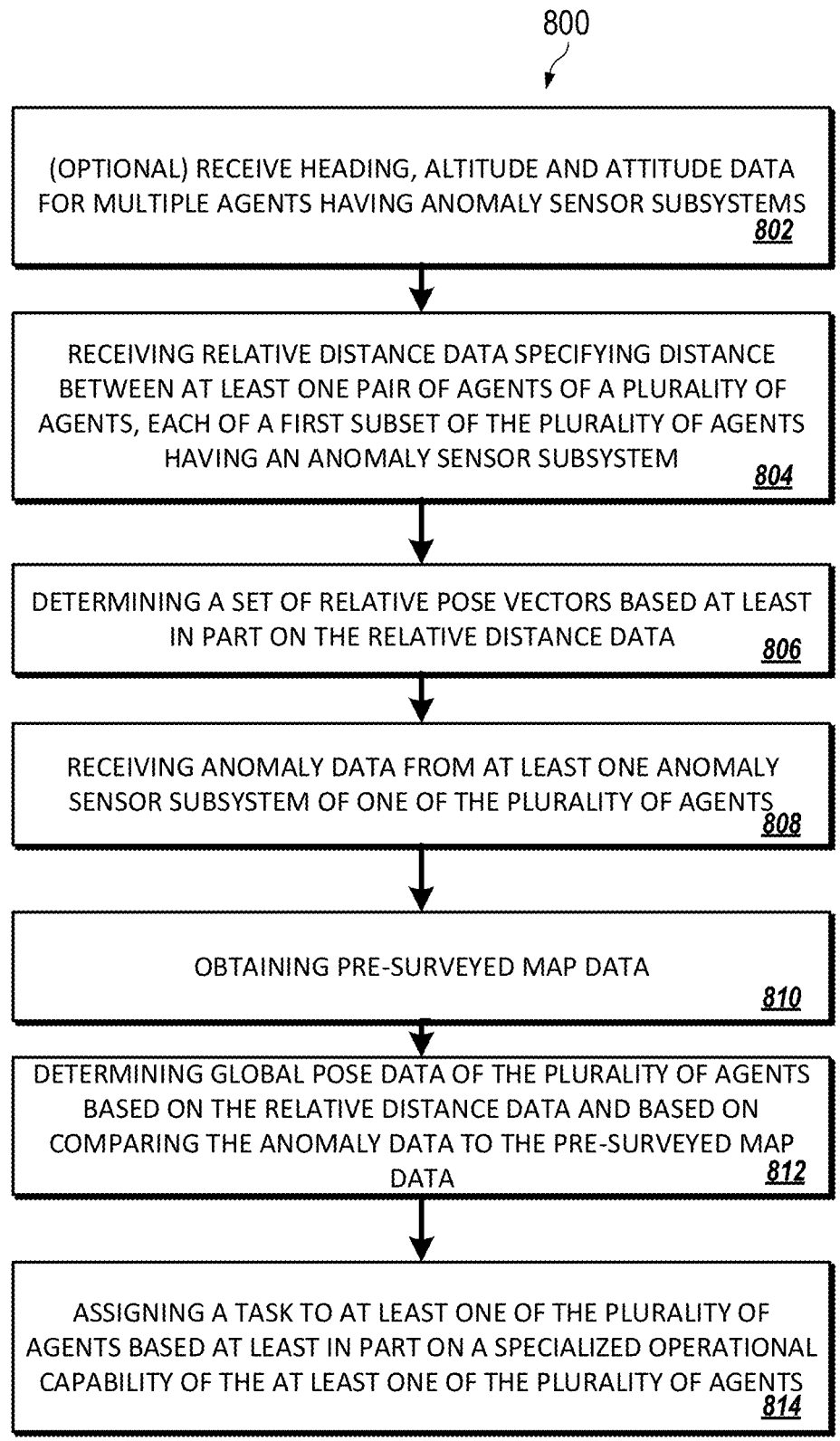
FIG. 8 illustrates an example process for anomaly-sensing based swarm navigation, according to some implementations.

FIG. 8 illustrates an example process 800 for anomaly-sensing based multi-agent navigation. The process includes: (optionally) receiving 802 heading, altitude and attitude data for one or more of a plurality of agents; receiving 804 relative distance data specifying distance between at least one pair of agents of the plurality of agents, each of a first subset of the plurality of agents having an anomaly sensor subsystem and each of a second subset of the plurality of agents not having an anomaly sensor subsystem; determining 806 a set of relative pose vectors based at least in part on the relative distance data; receiving 808 anomaly data from at least one anomaly sensor subsystem of one of the plurality of agents; obtaining 810 pre-surveyed map data; determining 812 global pose data of the plurality of agents based on the relative distance data and based on comparing the anomaly data to the pre-surveyed map data; and assigning 814 a task to at least one of the plurality of agents based at least in part on a specialized operational capability of the at least one of the plurality of agents.

Figure 9:
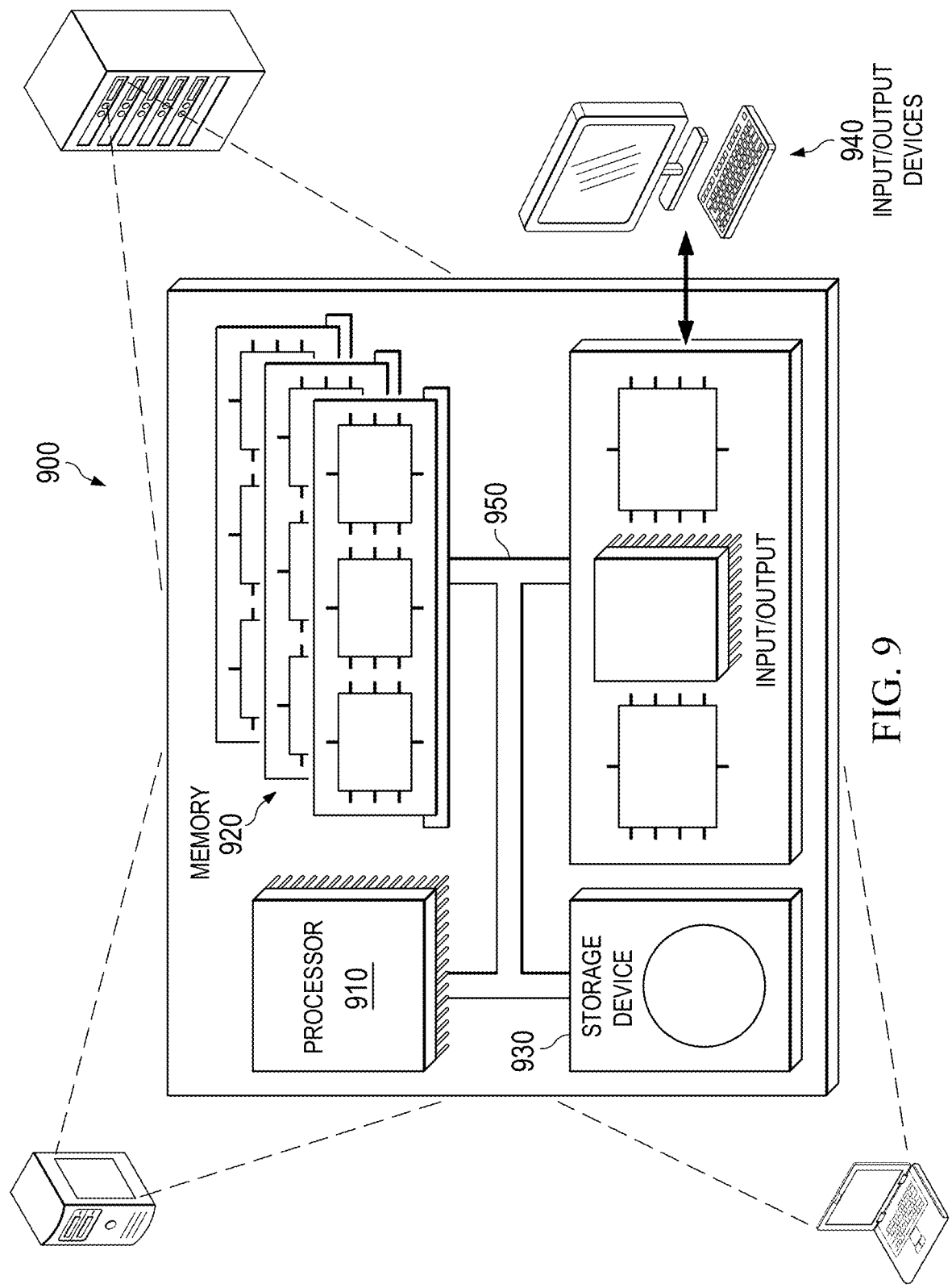
FIG. 9 is a schematic illustration of example computer systems that can be used to execute implementations of the present disclosure.

FIG. 9 illustrates a schematic diagram of an example computing system 900. The system 900 can be used for the operations described in association with the implementations described herein. For example, the system 900 may be included in the computer system discussed herein. The system 900 includes a processor 910, a memory 920, a storage device 930, and an input/output device 940. The components 910, 920, 930, and 940 are interconnected using a system bus 950. The processor 910 is capable of processing instructions for execution within the system 900. In some implementations, the processor 910 is a single-threaded processor. The processor 910 is a multi-threaded processor. The processor 910 is capable of processing instructions stored in the memory 920 or on the storage device 930 to display graphical information for a user interface on the input/output device 940.

The memory 920 stores information within the system 900. In some implementations, the memory 920 is a computer-readable medium. The memory 920 is a volatile memory unit. The memory 920 is a non-volatile memory unit. The storage device 930 is capable of providing mass storage for the system 900. The storage device 930 is a computer-readable medium. The storage device 930 may be a floppy disk device, a hard disk device, an optical disk device, or a tape device. The input/output device 940 provides input/output operations for the system 900. The input/output device 940 includes a keyboard and/or pointing device. The input/output device 940 includes a display unit for displaying graphical user interfaces.

Figure 10:
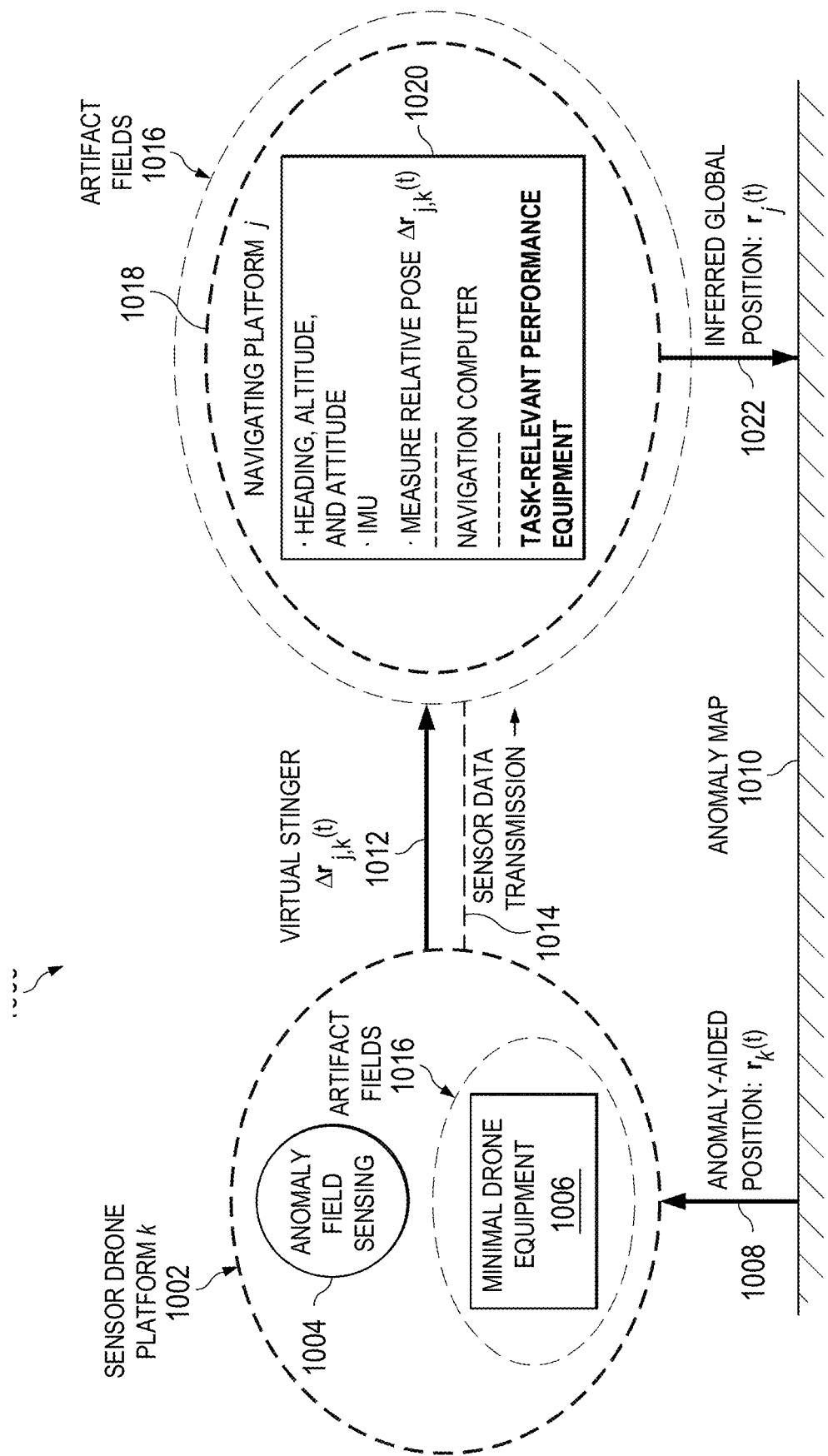
FIG. 10 illustrates an example of a swarm approach to anomaly sensing.

FIG. 10 illustrates an example of a swarm approach 1000 to anomaly sensing. The anomaly sensor 1004 is equipped on a sensor drone platform 1002, which allows it to be significantly displaced from interference fields 1016 generated on navigating platforms 1018 and to be more easily displaced from minimal drone equipment 1006. The navigating platform can include task-relevant performance equipment 1020, and a navigating platform 1018 that can include an inertial measurement unit and a navigation computer. The navigating platform can determine heading, attitude and altitude and can measure relative pose data. The navigating platform can determine global position 1022 based in part on the anomaly-aided position 1008 and/or the virtual stinger position 1012 of the sensor drone platform 1002 and in part on the measurement of the anomaly field sensor 1004 data transmitted 1014 to the navigating platform 1018. In other words, the sensor drone platform 1002 acts as a virtual stinger.

With reference to FIG. 10, a swarm approach allows for magnetic anomaly sensors to be significantly displaced from the artifact-generating equipment (engines, avionics, hulls, etc.) on task-performing platforms. The sensor drone can be thought of as a conceptual extension of the traditional stinger or boom. Instead of placing the sensor at the end of a long rigid component protruding from an independent agent's mobile platform, embodiments described in this specification place the sensor on its own mobile platform, which serves as one end of a "virtual stinger" relative to the task-performing navigator. The concept is illustrated in FIG. 11.

Figure 11:
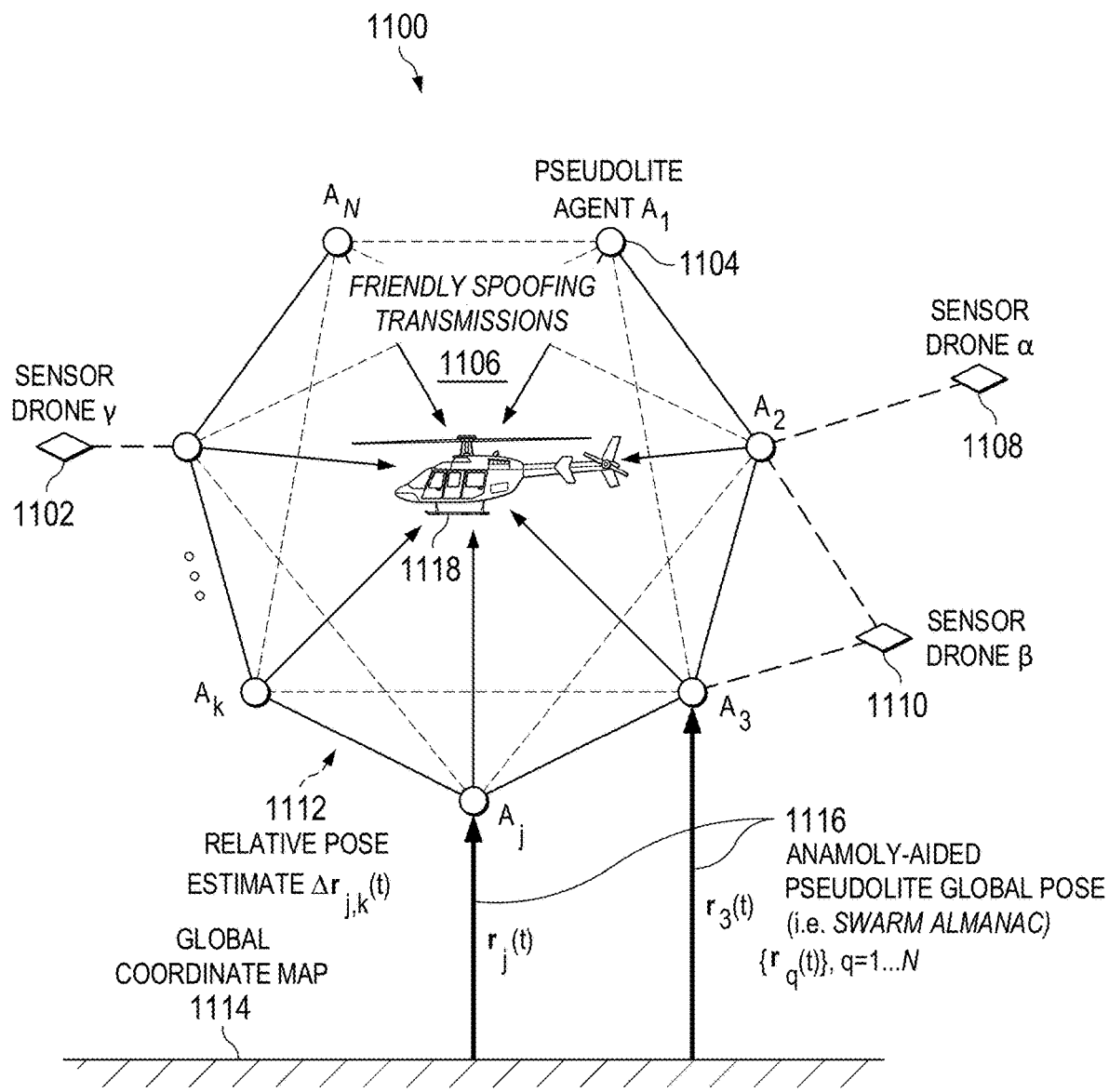
FIG. 11 illustrates an example of an anomaly-aided pseudolite swarm providing friendly spoofing to a mobile operations agent (indicated by helicopter).

FIG. 11 illustrates an example of an anomaly-aided pseudolite swarm 1100 providing friendly spoofing to a mobile operations agent (indicated by helicopter 1118). The pseudolite agent platforms 1104 are differentiated from the operations agent platform(s) 1118, and from optional sensor drone platforms 1102, 1108 and 1110 (which serve to improve the swarm's GPS-free navigation). The operations agent platform does not require any equipment retrofits to enjoy the benefits of anomaly-aided navigation. Meanwhile, the pseudolite agents do not need to be specially equipped to accomplish operational mission tasks. Again the relative pose estimate 1112 and the anomaly measurements made by the sensor drone(s) can be used to determine an anomaly-aided pseudolite global pose 1116.

A traditional rigid stinger's fixed displacement from a survey platform's navigation origin, can be stably calibrated at any time after build. Because the virtual stinger disclosed here exhibits a dynamic length and orientation, described by the relative pose $\Box r_{j,k}(t)$, these aspects must be measured often enough to provide for suitable anomaly-aided navigation updates to the operational platform. Such relative pose measurements are described above.

Embodiments described in specification provide a swarm method to suitably displace an anomaly sensor from interference-generating equipment, in order to reduce calibrated sensor output error. When the calibrated sensor error is reduced to the single nT to 10 s of nT level, accurate magnetic anomaly-aided map-matching MagNav can be achieved.

Lacking Rx (receive): In the case of the absolutely minimally-equipped sensor drone, there is no need for the agent to receive transmissions. Its role is to measure the anomaly field at its location and transmit that sensor data to the swarm. Its platform relative pose is estimated by other agents in the swarm. In fact, without GPS or an anomaly map on board, this minimal sensor drone can not determine where it is on a map-nor does it need to know.

Several useful swarm types are described below. Each swarm type consists of at least two agents.

System Type A: Differentiated Swarm with Sensor Drones/ Agents

There is no particular noise-reduction advantage in placing an anomaly sensor on a mobile platform that has the same interference-generating equipment as the primary navigating platform. Advantages are conveyed by outfitting the sensor drone with reduced equipment-which allows for a quieter sensor platform—while enabling enough mobility to accompany the task operators to the location of interest. These equipment differences can be substantial. For example, a sensor drone may be:

- equipped with minimal propulsion (minimizes moving ferrous parts and electric power circuits)
- stripped of cargo/passenger capacity—to reduce weight, and therefore minimize motor/fuel storage requirements
- stripped of operational avionics and computational equipment
- having a less ferrous/conductive sheet material than a corresponding task-oriented agent
- having a less constrained platform envelope design than a corresponding task-oriented agent
- large (i.e. non aerodynamic), e.g., larger than a corresponding task-oriented agent any or all of which can be utilized to reduce the impact of artifact fields on the sensor. Note that the term "drone" or "agent" here refers to its specialty job in the swarm, and does not necessarily mean "unmanned."

Subsystem: Minimal Sensor Drone/Agent

To give an explicit example near the extreme end of the minimal spectrum: consider a buoy-based drone type, which floats unaided on the open ocean. (A balloon-borne platform could be similarly configured.) Without a motor or stringent requirements for a compact aerodynamic hull, such free-floating sensor drones could be populated near a location of interest, where they could easily measure anomaly fields with little need for sophisticated platform calibration. Operating platforms in their vicinity, which need GPS-free navigation, could range themselves relative to the sensor drones and receive the drones' anomaly measurements via suitable communication methods.

What little artifact-generating equipment still remains necessary on the drone platform (i.e. the sensing and communication equipment) can be carefully optimized for low remnant field emission.

Moreover, the equipment can be displaced by significant distances from the anomaly sensor(s) on the drone platform itself. Compared to the 100-turn, 1 amp loop modeled in FIG. 1A to represent high-performance equipment, such a minimal drone could be configured with several orders of magnitude less artifact field strength, which would allow for clean anomaly sensing even if the sensor was displaced only by a few cm or 10 s of cm from the drone's power circuits.

The minimal sensor drone need not even be equipped with communicating reception equipment. At a minimum, all it must do is broadcast or transmit its sensor data, while its relative range is measurable by navigating platforms.

One specific way to enable such passive transmission is by writing sensor data on a LIDAR carrier via modulation: Certain embodiments can employ a navigating agent that directs a LIDAR pulse at the minimal sensor drone. The drone can modulate the returning signal with encoded sensor data. In the usual way, the navigating agent can determine the sensor drone's relative range by inspection of the LIDAR pulse time-of-flight. And in addition, an active navigating agent in a swarm can determine the drone's sensor reading by demodulation of the messages that the drone imprints on the LIDAR signal. Atmospheric LiDAR systems can return ranges from aerosols over distances of more than 10 kilometers. If there is a retroreflector on the remote agent, the range can be even larger. Commercial LIDAR systems adapted for flight applications have ranges of over 700 meters.

Such a minimal drone can have no anomaly map storage, and does not determine—or even need to determine—its own location. Although it is rangeable and emits signals, it is relatively disposable. Such a minimal drone configuration illustrates one configuration that accomplishes one goal of a swarm structure of distancing anomaly sensing from field-generating or field disturbing equipment.

System Type B: Differentiated Swarm with Operational Agent Types

Swarm agents may be outfitted with more than the bare minimum equipment described above. Some more-capable agent types may be able to more closely match the task/ navigation operations agents in terms of dynamics, and yet be more optimally configured for anomaly sensing than the task agents.

For example, by eliminating life-support and task-relevant equipment, an unmanned sensor agent could be configured with an anomaly sensor placed in a quieter platform location than it could be on a comparable fully-equipped manned platform. This could be the case even if the unmanned platform exhibits identical maneuvering performance as the main task/navigation operations agent(s).

Method: Federated Swarm Objectives

Independent agents with anomaly-aided navigation equipment currently find themselves burdened by conflicting simultaneous demands of certain task profiles that preferentially aid navigation, with task profiles that accomplish operational objectives.

In one example, an independent agent may receive mission guidance to maneuver at high speed and low altitude along a course that transits particularly anomaly-rich regions of the map (to improve GPS-denied navigation performance), while simultaneously receiving conflicting mission guidance to maneuver at low speed and high altitude over anomaly-sparse (yet operationally important) regions of the map.

In another example, airborne independent magnetic anomaly-aided sensing agents may receive guidance to conduct "calibration maneuvers," such as the Tolles-Lawson maneuvers, in order to characterize the remnant field of their dynamic platform for calibrated subtraction from later measurements. Such maneuvers deplete valuable mission time and fuel, are severely uncomfortable for passengers, and require complicated flight patterns that are not always allowed by regulatory or commercial guidelines. Moreover, to disambiguate the calibrated platform remnant field from true crustal anomalies, the maneuvers are best conducted in a well-mapped, high-altitude starting range. However, such a range may not be readily available.

With differentiated agents comprising a swarm, as disclosed herein, many novel tasks are realizable with federated objectives. This means that differentiated agent types can be assigned subset tasks of the swarm's overall task, which they are more effectively able to perform due to their distinguishing capabilities.

To resolve the above examples, embodiments described in this specification can utilize swarm advantages. De-conflicting location/trajectory guidance: some "anomaly-sensing" agents may traverse anomaly-rich regions of the map, and/or at low altitude, in order to increase navigation accuracy for the swarm. Meanwhile, other "stationkeeping" agents can dedicate themselves to the primary operational tasks, without special regard to the quality of the map in their location. De-conflicting calibration guidance: only the specialized "anomaly sensing" agents need to conduct the highest-performance calibration maneuvers, while operational platforms (including passenger platforms) gain the swarm-enabled navigation performance without needing to conduct such uncomfortable maneuvers.

System Type C: Pseudolite Swarm with Passive Operations Agents

This specification discloses a method by which existing platform types-which currently utilize GPS receivers—may be granted the advantages of anomaly-aided swarm navigation, without being modified or retrofitted in any way. This approach illustrates the least-modified end of the differentiation spectrum for possible agent platform types.

Method: Friendly Spoofing

In certain embodiments, unmodified dynamic agents can be surrounded by a mobile, anomaly-aided, pseudolite swarm. The pseudolite swarm first uses anomaly-aided sensing and navigation to localize itself relative to the global map, without continuously relying on true GPS itself. The swarm then broadcasts GPS-like signals to the unmodified agents operating within the receiving range of the pseudolite transmitters. The concept is illustrated in FIG. 11.

Lacking Tx (transmit): In the case of an agent type that must not exhibit any overt or active communication signatures, such equipment can be usefully removed. Passive operations agents are equipped to benefit from the anomaly-aided pseudolite signals. But, they are not fully cooperative members of the swarm. This is just as in the case of ordinary passive operations agents making use of GPS signals for their own navigation, which are not considered members of the GPS constellation.

The mobile pseudolite swarm can be positioned with much closer proximity to the unmodified agents than true space-based satellites in the GPS constellation. The pseudolites also enjoy greatly increased carrying capacity compared to what space-based satellites can bear. Because of their proximity and capacity, the pseudolite swarm can send powerful GPS-like transmissions that easily overcome low-power GPS jam/spoof equipment. Such signals can also deliver improved precision navigation. In fact, the pseudolite swarm can be thought of as providing "friendly spoofing," by overwhelming local RF interference (or GPS loss) with usable signals. In certain embodiments, the friendly spoofed GPS signal can have a power at the receiving agent of at least -100 dBm and in certain embodiments, the friendly spoofed GPS signal can have an output power of at least 125 mW.

Operations agents can be modified to receive both traditional GPS and pseudo-GPS from anomaly-aided friendly spoofers. If a parallel protocol is established, anomaly-aiding could be retrofitted to existing platforms without actually interfering with true GPS/GNSS. Even if software revisions and/or hardware (i.e. new receiver module) equipment revisions are required in certain circumstances for such a parallel protocol, such retrofits can be less burdensome than equipping legacy platforms fully with anomaly sensing and/or advanced IMU systems.

Anomaly-aided pseudolites can be deployed in greater numbers, at lower cost, with more frequent equipment updates, and greater replaceability in the field than satellites.

The friendly spoofing pseudolite array can transmit useful navigation messages to mobile operators using encoded magnetic field transmissions. In some environments-especially underwater—these signals have the advantage of greater penetration depth than RF, and therefore larger standoff range from the pseudolites.

Consider, as a specific example, if the operations agent was a seafloor submersible craft in need of accurate navigation. This capability could be provided by an accompanying mobile submarine pseudolite swarm, which would localize itself using map-matching to the crustal anomaly field, while transmitting strong navigation signals in close proximity to the seafloor agent.

This is advantageous compared to existing methods, which typically call for installation of fixed pseudolite beacons in a fixed range on the seafloor.

System Type D: Swarm Prodigy Agent Type with Cloud Computation and Storage

By inspecting the swarm function table (table 1 above), the swarm prodigy agent type can be seen as composed of three distinct agent subtypes: the anomaly-aided pseudolite, the navigation computer, and the sensor drone. The collective functions of a swarm prodigy agent type are fully enabled by its composition of the subtypes, with sufficient intercommunication.

A subsystem configuration type can employ high-capacity communication equipment to compensate for advantageous removal of local storage and computation equipment from mobile agent platforms. This is effectively a "cloud" architecture for the navigation computer, which may be equipped at a stationary, remote location. It need not be mobile. Merely its data and computations need to be accessible to the swarm, via sufficient communication capacity.

In another embodiment, the navigation computer may be mobile. But, it is equipped on a large-SWaP+C mobile platform that accompanies the swarm, while not acting as a fully cooperative anomaly navigating member of it.

In all swarm system types described by the present disclosure, it is to be understood that swarm prodigy agents may be embodied either by fully self-contained mobile platforms, or by platforms with effectively separated navigation storage+computation functions. These embodiment choices do not affect the functional equivalence of the described swarm systems.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

We claim:

1. A method, comprising:
receiving relative distance data specifying distance between at least one pair of agents of a plurality of agents, each of a first subset of the plurality of agents having an anomaly sensor subsystem and each of a second subset of the plurality of agents not having an anomaly sensor subsystem;
determining a set of relative pose vectors based at least in part on the relative distance data;
receiving anomaly data from the at least one anomaly sensor subsystem of one of the plurality of agents;
obtaining pre-surveyed map data;
determining global pose data of the plurality of agents based on the relative distance data and based on comparing the anomaly data to the pre-surveyed map data; and
assigning a task to at least one of the plurality of agents based at least in part on a specialized operational capability of the at least one of the plurality of agents, wherein assigning the task to the at least one of the plurality of agents based at least in part on the specialized operational capability of the at least one of the plurality of agents comprises:
causing at least one of the first subset of the plurality of agents to traverse at least one anomaly-rich region by providing instruction to the at least one of the first subset of the plurality of agents; and
causing at least one of the second subset of the plurality of agents to conduct a non-anomaly sensing task by providing instruction to the at least one of the second subset of the plurality of agents.

2. The method of claim 1 wherein receiving the anomaly data from the at least one anomaly sensor subsystem comprises receiving anomaly sensor data from an agent written on a carrier via modulation and wherein the method further comprises determining the anomaly sensor data by demodulation of the anomaly sensor data written on the carrier via modulation.

3. The method of claim 2 wherein the carrier is LIDAR.

4. The method of claim 2 wherein at least one of the plurality of agents in the first subset does not have communication reception equipment.

5. The method of claim 2 wherein at least one of the plurality of agents in the first subset does not have communication transmission equipment.

6. The method of claim 1 wherein at least one of the plurality of agents is a balloon.

7. The method of claim 1 wherein at least one of the plurality of agents is a buoy.

8. The method of claim 1 wherein at least one of the plurality of agents has an anomaly sensor subsystem distanced by at least 10 centimeters but less than 2 meters from artifact-generating equipment.

9. The method of claim 1 wherein the method comprises maintaining a minimum virtual stinger distance between a navigating platform agent and an agent in the first subset of at least 2 meters.

10. The method of claim 1 wherein at least one of the plurality of agents has no passenger capacity.

11. The method of claim 1 wherein at least one of the plurality of agents has no life-support.

12. The method of claim 1 wherein the method is performed on a navigation platform comprising a navigation engine and task-relevant performance equipment.

13. The method of claim 1 wherein the anomaly data is at least one of magnetic anomaly and gravitational anomaly data.

14. The method of claim 1 wherein the second subset of the plurality of agents comprises an unmodified dynamic GPS capable agent and wherein the method further comprises at least one agent in the first subset of the plurality of agents transmitting a friendly spoofed GPS signal to the unmodified dynamic GPS capable agent, the friendly spoofed GPS signal based at least in part on data from an anomaly sensor subsystem.

15. The method of claim 1 wherein the second subset of the plurality of agents comprises a dynamic GPS capable agent modified to receive a friendly spoofed GPS signal and wherein the method further comprises at least one agent in the first subset of the plurality of agents transmitting a friendly spoofed GPS signal to the dynamic GPS capable agent, the friendly spoofed GPS signal based at least in part on data from an anomaly sensor subsystem.

16. The method of claim 1 wherein receiving the anomaly data from the at least one anomaly sensor subsystem comprises receiving ranging data and anomaly data using encoded magnetic field transmissions.

17. The method of claim 1 wherein the method further comprises providing navigation instructions from a navigation agent to each other agent in the plurality of agents such that each agent maintains a distance of less than 1000 meters from at least one other agent in the plurality of agents.

18. A system, comprising:
one or more computers and one or more storage devices on which are stored instructions that are operable, when executed by the one or more computers, to cause the one or more computers to perform operations comprising:
receiving relative distance data specifying distance between at least one pair of agents of a plurality of agents, each of a first subset of the plurality of agents having an anomaly sensor subsystem and each of a second subset of the plurality of agents not having an anomaly sensor subsystem;
determining a set of relative pose vectors based at least in part on the relative distance data;
receiving anomaly data from the at least one anomaly sensor subsystem of one of the plurality of agents;
obtaining pre-surveyed map data;
determining global pose data of the plurality of agents based on the relative distance data and based on comparing the anomaly data to the pre-surveyed map data; and
assigning a task to at least one of the plurality of agents based at least in part on a specialized operational capability of the at least one of the plurality of agents, wherein assigning the task to the at least one of the plurality of agents based at least in part on the specialized operational capability of the at least one of the plurality of agents comprises:
causing at least one of the first subset of the plurality of agents to traverse at least one anomaly-rich region by providing instruction to the at least one of the first subset of the plurality of agents; and causing at least one of the second subset of the plurality of agents to conduct a non-anomaly sensing task by providing instruction to the at least one of the second subset of the plurality of agents.

19. One or more computer-readable storage media encoded with instructions that, when executed by one or more computers, cause the one or more computers to perform operations comprising:
  receiving relative distance data specifying distance between at least one pair of agents of a plurality of agents, each of a first subset of the plurality of agents having an anomaly sensor subsystem and each of a second subset of the plurality of agents not having an anomaly sensor subsystem;
  determining a set of relative pose vectors based at least in part on the relative distance data;
  receiving anomaly data from the at least one anomaly sensor subsystem of one of the plurality of agents;
  obtaining pre-surveyed map data;
  determining global pose data of the plurality of agents based on the relative distance data and based on comparing the anomaly data to the pre-surveyed map data; and
  assigning a task to at least one of the plurality of agents based at least in part on a specialized operational capability of the at least one of the plurality of agents, wherein assigning the task to the at least one of the plurality of agents based at least in part on the specialized operational capability of the at least one of the plurality of agents comprises:
    causing at least one of the first subset of the plurality of agents to traverse at least one anomaly-rich region by providing instruction to the at least one of the first subset of the plurality of agents; and
    causing at least one of the second subset of the plurality of agents to conduct a non-anomaly sensing task by providing instruction to the at least one of the second subset of the plurality of agents.

* * * * *